US012065217B2

(12) United States Patent
Allen et al.

(10) Patent No.: US 12,065,217 B2
(45) Date of Patent: Aug. 20, 2024

(54) BICYCLE GEARBOX HAVING SEGMENTED SPROCKETS

(71) Applicant: Praxis Works LLC, Santa Cruz, CA (US)

(72) Inventors: David Allen, Santa Cruz, CA (US); David M. Earle, Santa Cruz, CA (US); Ryan Kent Miller, Santa Cruz, CA (US); Michael David Machado, Salinas, CA (US)

(73) Assignee: Praxis Works LLC, Santa Cruz, CA (US)

( * ) Notice: Subject to any disclaimer, the term of this patent is extended or adjusted under 35 U.S.C. 154(b) by 0 days.

(21) Appl. No.: 18/303,455

(22) Filed: Apr. 19, 2023

(65) Prior Publication Data

US 2023/0294793 A1   Sep. 21, 2023

Related U.S. Application Data

(63) Continuation-in-part of application No. 18/165,884, filed on Feb. 7, 2023, which is a continuation of application No. 17/242,036, filed on Apr. 27, 2021, now Pat. No. 11,572,135, which is a continuation of application No. 17/152,483, filed on Jan. 19, 2021,
(Continued)

(51) Int. Cl.
*B62M 9/14* (2006.01)
*B62M 9/10* (2006.01)
*B62M 9/1342* (2010.01)
*B62M 9/136* (2010.01)
*B62M 25/08* (2006.01)

(52) U.S. Cl.
CPC ............ *B62M 9/14* (2013.01); *B62M 9/1342* (2013.01); *B62M 9/136* (2013.01); *B62M 25/08* (2013.01); *B62M 9/10* (2013.01)

(58) Field of Classification Search
CPC ........ B62M 1/36; B62M 9/14; B62M 9/1342; B62M 9/10; B62M 9/04; F16H 55/54; F16H 55/56; F16H 9/24; F16H 9/12
USPC ............................ 474/47, 48, 52, 53, 54, 57
See application file for complete search history.

(56) References Cited

U.S. PATENT DOCUMENTS 519,781 A * 5/1894 Timm ..................... F16H 55/54
74/447
593,932 A * 11/1897 Golding .................. F16H 55/54
474/47
(Continued)

*Primary Examiner* — Henry Y Liu
(74) *Attorney, Agent, or Firm* — Kolitch Romano Dascenzo Gates LLC

(57) ABSTRACT

A method for shifting a segmented gear may include rotating a gear cluster including a first gear and a coaxial second gear using a power transfer mechanism (e.g., a belt or a chain). The power transfer mechanism defines a plane and is wrapped partially around the first gear, and wherein the first gear has a plurality of gear segments independently movable (e.g., pivotable or translatable) into and out of the plane. A plurality of radially transitionable sliders are rotated in tandem with the first gear, and each of the sliders is operatively coupled to a corresponding one of the gear segments of the first gear. In sequence, each segment of the first gear is moved out of the plane of the power transfer mechanism by urging the slider in a radial direction using a segment actuator, such that the power transfer mechanism wraps at least partially around the second gear.

19 Claims, 28 Drawing Sheets

US 12,065,217 B2
Page 2

Related U.S. Application Data now Pat. No. 10,988,207, which is a continuation-in-part of application No. 16/998,010, filed on Aug. 20, 2020, now Pat. No. 11,572,131, which is a continuation-in-part of application No. 16/792,050, filed on Feb. 14, 2020, now Pat. No. 10,989,281.

(60) Provisional application No. 63/332,609, filed on Apr. 19, 2022, provisional application No. 63/067,911, filed on Aug. 20, 2020, provisional application No. 62/963,064, filed on Jan. 19, 2020, provisional application No. 62/963,063, filed on Jan. 19, 2020, provisional application No. 62/805,746, filed on Feb. 14, 2019.

(56) References Cited

U.S. PATENT DOCUMENTS

| | | | | |
|---|---|---|---|---|
| 601,990 A | * | 4/1898 | Suter | F16H 55/54 74/447 |
| 1,662,037 A | * | 3/1928 | Wichtendahl | F16H 9/24 474/53 |
| 2,782,649 A | * | 2/1957 | Shortland | F16H 9/24 474/47 |
| 2,827,795 A | * | 3/1958 | Caballeros | F16H 9/24 474/134 |
| 3,769,848 A | * | 11/1973 | McGuire | B62M 9/14 474/70 |
| 3,800,613 A | * | 4/1974 | Clark | F16H 9/24 474/54 |
| 3,861,227 A | * | 1/1975 | Hunt | B62M 9/08 474/47 |
| 4,127,038 A | * | 11/1978 | Browning | B62M 9/12 280/236 |
| 4,457,739 A | * | 7/1984 | Iseman | F16H 55/54 474/69 |
| 4,580,997 A | * | 4/1986 | Browning | B62M 9/14 474/160 |
| 4,592,738 A | * | 6/1986 | Nagano | B62M 9/14 474/162 |
| 4,713,042 A | * | 12/1987 | Imhoff | B62M 9/14 474/69 |
| 5,073,152 A | * | 12/1991 | Browning | B62M 9/16 474/162 |
| 5,152,720 A | * | 10/1992 | Browning | B62M 9/16 474/80 |
| 5,205,794 A | * | 4/1993 | Browning | B62M 9/14 474/160 |
| 5,354,243 A | * | 10/1994 | Kriek | B62M 9/14 474/135 |
| 5,443,423 A | * | 8/1995 | Ha | F16H 55/52 474/49 |
| 5,637,046 A | * | 6/1997 | Ha | F16H 9/10 474/70 |
| 5,984,814 A | * | 11/1999 | Davenport | B62M 9/08 474/57 |
| 6,173,982 B1 | * | 1/2001 | Westergard | B62M 9/14 280/261 |
| 6,267,699 B1 | * | 7/2001 | Gruich | B62M 9/14 474/49 |
| 8,257,209 B1 | * | 9/2012 | Lane | F16H 9/10 474/70 |
| 8,753,236 B2 | * | 6/2014 | Wong | F16H 9/24 474/47 |
| 9,816,598 B2 | * | 11/2017 | Wong | F16H 9/06 |
| 10,259,532 B2 | * | 4/2019 | Schuster | B62M 9/14 |
| 10,703,443 B2 | * | 7/2020 | Schuster | B62M 9/12 |
| 2002/0084618 A1 | * | 7/2002 | Lerman | B62M 1/36 280/281.1 |
| 2005/0215367 A1 | * | 9/2005 | Thomasberg | B62M 9/14 474/82 |
| 2006/0068956 A1 | * | 3/2006 | Matsumoto | B62M 11/00 474/80 |
| 2009/0124440 A1 | * | 5/2009 | Milne | B62M 9/14 474/80 |
| 2013/0225340 A1 | * | 8/2013 | Tzvetkov | B62M 9/134 474/80 |
| 2013/0267362 A1 | * | 10/2013 | Gheciu | B62M 9/105 474/164 |
| 2014/0248982 A1 | * | 9/2014 | Schuster | B62M 9/06 474/69 |
| 2014/0323253 A1 | * | 10/2014 | Williams | F16H 9/24 474/69 |
| 2016/0040772 A1 | * | 2/2016 | Appleton | F16H 55/54 474/55 |
| 2016/0257373 A1 | * | 9/2016 | Emura | B62K 25/286 |
| 2017/0233037 A1 | * | 8/2017 | Hara | B62M 9/14 474/78 |
| 2017/0283006 A1 | * | 10/2017 | Schuster | F16H 55/54 |
| 2018/0290713 A1 | * | 10/2018 | Tetsuka | B62M 9/14 |
| 2018/0339747 A1 | * | 11/2018 | Niki | B62J 43/20 |
| 2019/0135376 A1 | * | 5/2019 | Kakinoki | B62M 9/122 |
| 2021/0003201 A1 | * | 1/2021 | Wong | F16H 55/12 |

* cited by examiner

BICYCLE GEARBOX HAVING SEGMENTED SPROCKETS

CROSS-REFERENCES

The following applications and materials are incorporated herein, in their entireties, for all purposes: U.S. patent application Ser. No. 18/165,884, filed Feb. 14, 2023; U.S. patent Ser. No. 17/242,036, filed Apr. 27, 2021, now U.S. Pat. No. 11,572,135; U.S. patent application Ser. No. 17/152,483, filed Jan. 19, 2021, now U.S. Pat. No. 10,988,207; U.S. patent application Ser. No. 16/792,050, filed Feb. 14, 2020, now U.S. Pat. No. 10,989,281; U.S. patent application Ser. No. 16/998,010, filed Aug. 20, 2020, now U.S. Pat. No. 11,572,131; U.S. Provisional Patent Application Ser. No. 63/332,609, filed Apr. 19, 2022; U.S. Provisional Patent Application Ser. No. 62/963,064, filed Jan. 19, 2020; and U.S. Provisional Patent Application Ser. No. 63/067,911, filed Aug. 20, 2020.

FIELD

This disclosure relates to systems and methods for shifting gears on a bicycle or other geared vehicle. More specifically, this disclosure relates to gearboxes.

INTRODUCTION

A bicycle drivetrain transmits power from a rider of a bicycle to the bicycle's wheels. The drivetrain typically includes two pedals attached to respective crankarms on opposing sides of the bicycle frame. The pedals are rotationally coupled to a gearing system, which typically has a plurality of different gear ratios and a mechanism for shifting gears to effect a desired gear ratio. On a bicycle having a gearbox, the gearing system is at least partially enclosed in a gearbox disposed on and/or incorporated into the bicycle frame. An advantage of the gearbox is that the gearing system within the box may be protected from exposure to dirt and moisture, as well as from damaging impacts. Another advantage is that the gearbox is suitable for mounting on the bicycle frame adjacent the crankarms, where the weight of the gearbox has a lower impact on bicycle handling than it typically would if the gearbox were mounted elsewhere (e.g., further from the bicycle center of gravity). Accordingly, further advancements in bicycle gearbox technology are desirable.

SUMMARY

The present disclosure provides systems, apparatuses, and methods relating to bicycle gearboxes having segmented sprockets.

In some examples, a method for shifting a segmented gear includes: rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane; rotating a plurality of radially transitionable sliders in tandem with the first gear, wherein each of the sliders has a pair of ramped cam surfaces and is operatively coupled to a corresponding one of the gear segments of the first gear; and sequentially moving each segment of the first gear out of the plane of the power transfer mechanism by urging the slider in a radial direction using a segment actuator, such that the power transfer mechanism wraps at least partially around the second gear.

In some examples, a method for shifting a segmented gear includes: rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane; rotating a plurality of radially transitionable sliders in tandem with the first gear, wherein each of the sliders has a pair of ramped cam surfaces and is operatively coupled to a corresponding one of the gear segments of the first gear; extending a first pin of a multi-pin actuator, wherein the multi-pin actuator is stationary with respect to the rotating sliders, such that the first pin is in a path of a first one of the ramped cam surfaces; and sequentially moving each segment of the first gear out of the plane of the power transfer mechanism by urging the slider in a radial direction when the first pin strikes the first ramped cam surface, such that the power transfer mechanism wraps at least partially around the second gear.

Features, functions, and advantages may be achieved independently in various embodiments of the present disclosure, or may be combined in yet other embodiments, further details of which can be seen with reference to the following description and drawings.

DETAILED DESCRIPTION

Figure 1:
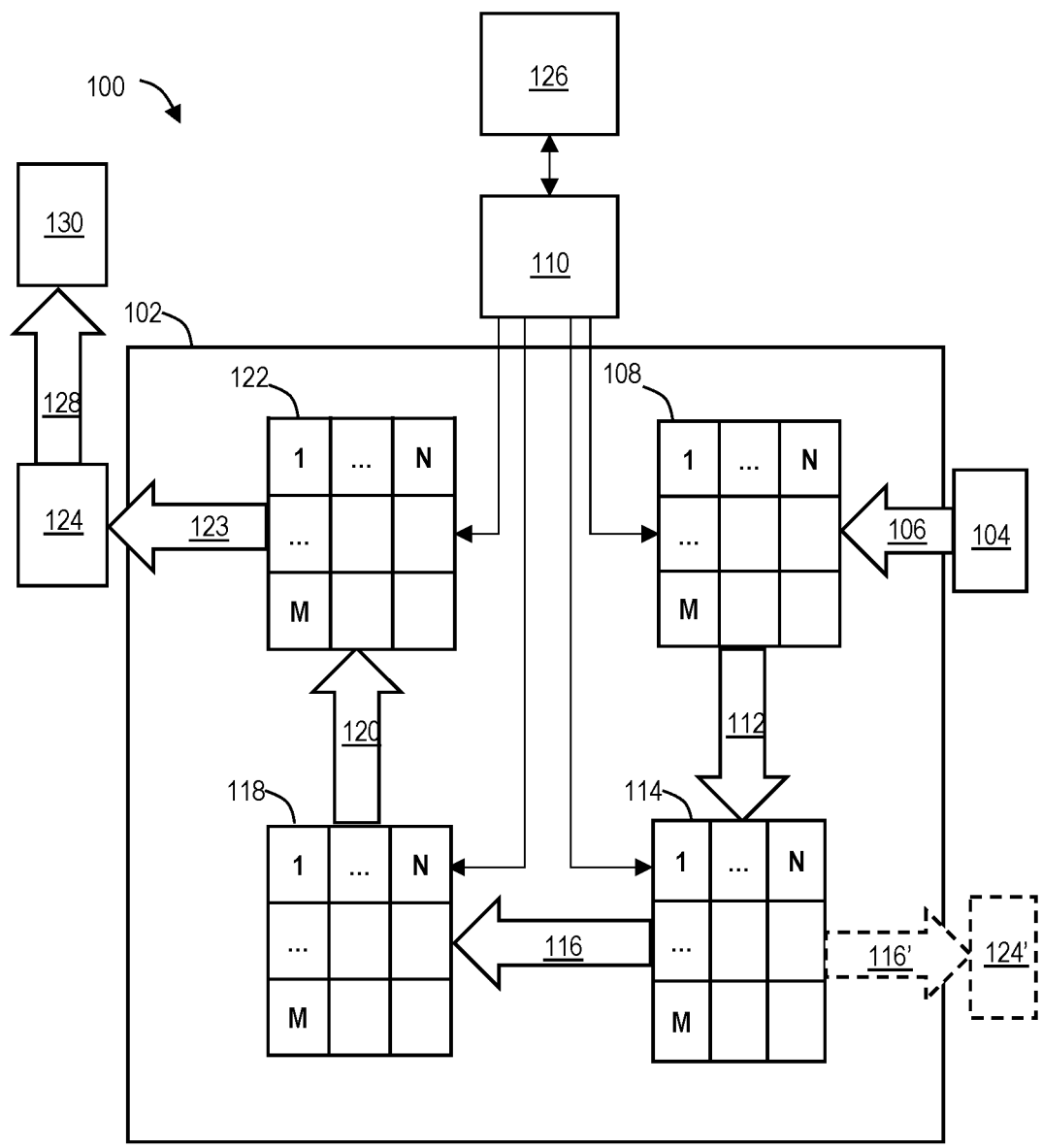
FIG. 1 is a schematic view of an illustrative gearbox in accordance with aspects of the present disclosure.

Various aspects and examples of a gearbox having segmented sprocket clusters and a corresponding shifting system, as well as related methods, are described below and illustrated in the associated drawings. Unless otherwise specified, a gearbox in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (2) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," and "aft" (and the like) are intended to be understood in the context of a host vehicle, such as a bicycle, on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a component may have a "forward" edge, based on the fact that the component would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a gearbox in accordance with aspects of the present teachings includes gear clusters (AKA cogsets, cassettes, and/or sprocket clusters) coupled by one or more chains and/or belts and at least partially contained within a housing, wherein one or more of the gear clusters has a segmented sprocket. A shifter is configured to move the sprocket segments relative to a plane defined by a chain or belt associated with that sprocket. The housing may be mounted on and/or integral with a bicycle or other suitable vehicle. Each gear cluster includes at least one sprocket, also referred to as a gear. At least one of the gear clusters is mounted on a spindle (AKA an axle or a shaft) coupled at either end to bicycle crankarms (AKA cranks) and/or a drive motor, and at least one other of the gear clusters is mounted on a layshaft. Chains, belts, and/or any other suitable coupling device couple a gear cluster on the spindle to a gear cluster on the layshaft, such that rotation of one of the gear clusters causes rotation of the other gear cluster. Each chain or belt may selectively engage individual sprockets in a cluster. The combination of sprockets coupled to each chain or belt at a given moment determines the current gear ratio of the gearbox.

Shifting gear ratios of the gearbox may include sequential displacement of the segments of a selected segmented gear, such that the chain or belt is shifted onto a different sprocket or gear of the gear cluster without displacing the chain or belt in a lateral direction. Repositioning of the gear segments is performed at a respective time when each segment is unloaded (i.e., free of the chain/belt), such that shifting may be performed under load without negative consequences. Multiple segmented sprockets of the gearbox may be simultaneously shifted in this manner, if desired.

Examples, Components, and Alternatives

The following sections describe selected aspects of illustrative bicycle gearboxes as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Schematic Diagram of a Gearbox of the Present Disclosure

As shown schematically in FIG. 1, this section describes an illustrative gearbox 100 having segmented gear clusters. Gearbox 100 may be utilized in a traditional pedal-powered bicycle, a pedal-assist electric bicycle, a fully electric bicycle, or other suitable vehicle. Gearbox 100 includes a housing 102 having a gearing system disposed within. The gearing system includes a plurality of (e.g., four) gear clusters, namely a first gear cluster 108, a second gear cluster 114, a third gear cluster 118, and a fourth gear cluster 122, arranged as shown in FIG. 1. Each gear cluster has a plurality of individual gears labeled 1 through N. Each gear of the cluster has a plurality of individual gear segments labeled 1 through M. In some examples, each gear of each gear cluster has the same number of gear segments. In some examples, the number of segments may vary from gear to gear.

Each gear comprising gear segments is referred to as a segmented gear. Each gear segment is shaped as an annular sector. In some examples, a segmented gear comprises four gear segments. A selected gear of each gear cluster is coupled to (i.e., engaged with) a chain by teeth arranged around a periphery thereof. In some examples, two or more gear clusters may be engaged with the same chain. Each gear segment of a segmented gear is movable with respect to the chain. The movement of gear segments is utilized to shift between gear ratios. In some examples, each gear segment may be pivotable about a hinge joint disposed at an axle end of the segment. In some examples, each gear segment may be linearly displaceable (e.g., translated or shifted axially).

Gearbox 100 includes an associated shifting system 110. Shifting system 110 is configured to individually move segments of the segmented gears into and out of engagement with the respective chain. Shifting system 110 may be coupled to a controller 126, which is configured to send command signals to one or more actuators of the shifting system to change gear ratios. For example, controller 126 may signal the shifting system to increase the gear ratio. Shifting is described further in sections below.

In principle, gearbox 100 may be operable with any gear ratio achievable by the installed cogsets. In some cases, however, controller 126 is configured to allow a rider to select only a subset of gear ratios. For example, in some cases two or more different combinations of gears may produce identical or nearly identical gear ratios. Providing the vehicle operator with a set of selectable gear combinations that includes different gear combinations that result in substantially the same gear ratio may be unhelpful and confusing. Accordingly, shifting system 110 and/or controller 126 may be configured to enable selection of only one of the redundant gear combinations.

Gearbox 100 includes a crankset 104 disposed outside of housing 102 and coupled to a spindle 106. Spindle 106 passes through housing 102 to engage first gear cluster 108, such that rotation of the crankset causes rotation of the spindle which, in turn, causes rotation of the first gear cluster.

First gear cluster 108 is coupled to a first chain 112 such that rotation of the gear cluster causes rotation of the chain. First chain 112 may be oriented orthogonally with respect to spindle 106.

First chain 112 is coupled to second gear cluster 114, thereby transmitting power from cluster 108 to cluster 114. Second gear cluster 114 is coupled to third gear cluster 118 via a layshaft 116. Accordingly, rotation of chain 112 using the crankshaft and first gear cluster drives the rotation of second gear cluster 114, which rotates layshaft 116 and third gear cluster 118. Layshaft is generally parallel to and spaced from spindle 106. Third gear cluster 118 is coupled to a second chain 120 which is further coupled to a fourth gear cluster 122, such that rotation of third gear cluster 118 causes rotation of fourth gear cluster 122.

Fourth gear cluster 122 is coupled to an external chainring 124 (i.e., disposed outside of housing 102) via an output shaft 123 that passes through housing 102. Output shaft 123 is coaxial with spindle 106, such that spindle 106 passes through the center of output shaft 123. Spindle 106 and output shaft 123 are configured to rotate independently with respect to one another. Chainring 124 is coupled to an output system 130 (e.g., a rear wheel) via a third chain 128.

In some examples, more or fewer gear clusters and/or layshafts may be included. For example, a two-cluster version of gearbox 100 may include first gear cluster 108 on spindle 106, chain 112, and second gear cluster 114 on layshaft 116. In this example, gear clusters 118 and 122 are excluded, and the drive output is via a chainring 124' coupled to layshaft 116' as shown in dashed outline in FIG. 1. In other examples, additional gear clusters may be interspersed with those shown in FIG. 1, to provide additional gear ratios and combinations.

B. Second Illustrative Gearbox

This section describes a gearbox 200, which is an example of gearbox 100 described above. See FIGS. 2-27. Gearbox 200 may be utilized in a traditional pedal-powered bicycle, a pedal-assist electric bicycle, a fully electric bicycle, or other suitable vehicle.

Figure 2:
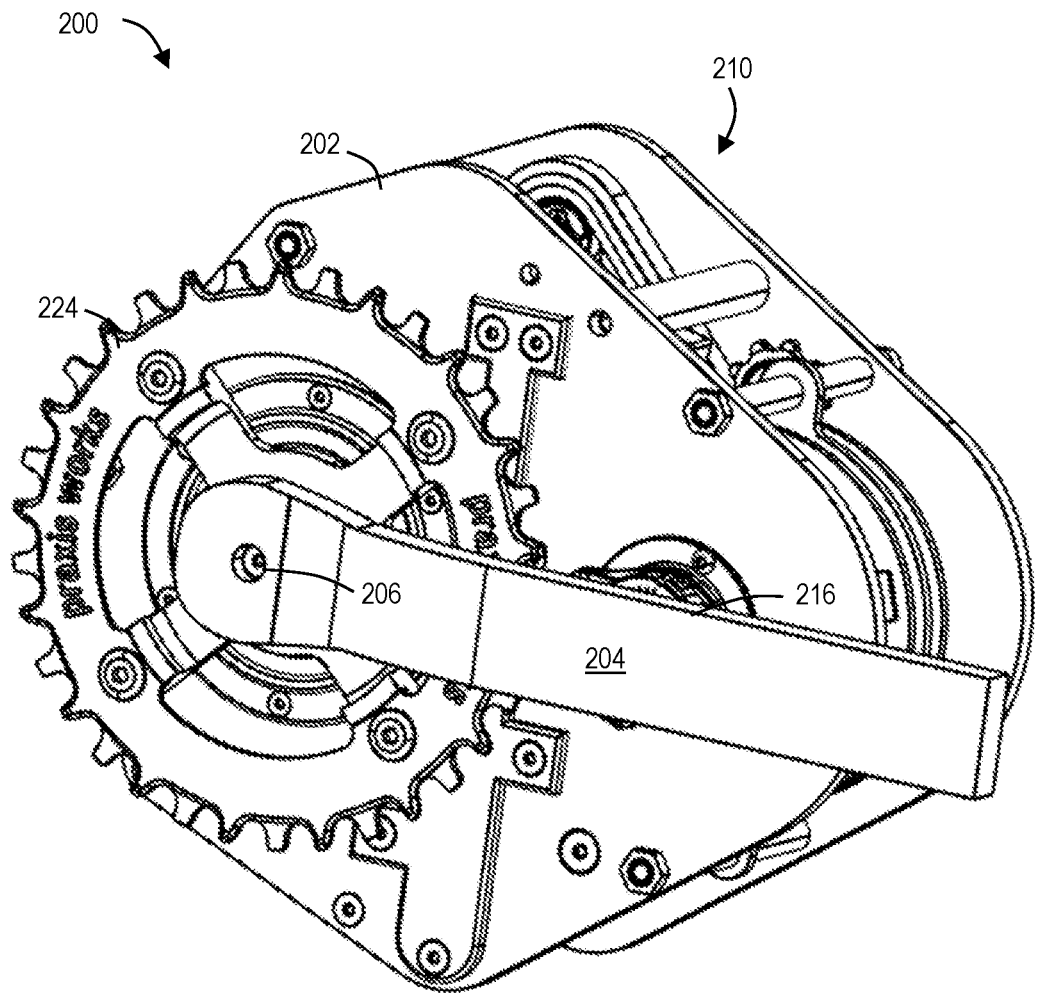
FIG. 2 is an isometric view of a gearbox which is an example of the gearbox depicted in FIG. 1.
Figure 23:
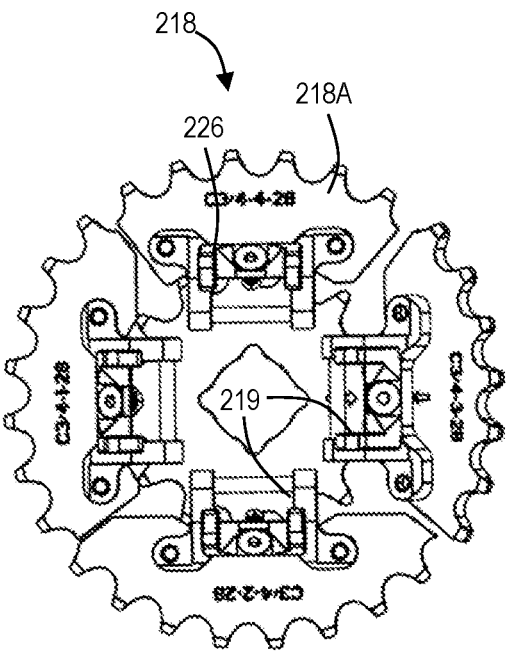
FIG. 23 is a rear view of the gear cluster of FIG. 22.

As shown in FIGS. 2 and 23, gearbox 200 includes a housing 202. The housing at least partially contains a gearing system, as described above. An Illustrative gearing system for gearbox 200 is described further below. A spindle 206 extends through the housing. A first crankarm 204 and a second crankarm (not shown) are coupled to respective ends of spindle 206, and a chainring 224 couples gearbox 200 to a wheel (e.g., a rear wheel, via an external drive chain or belt).

Figure 4:
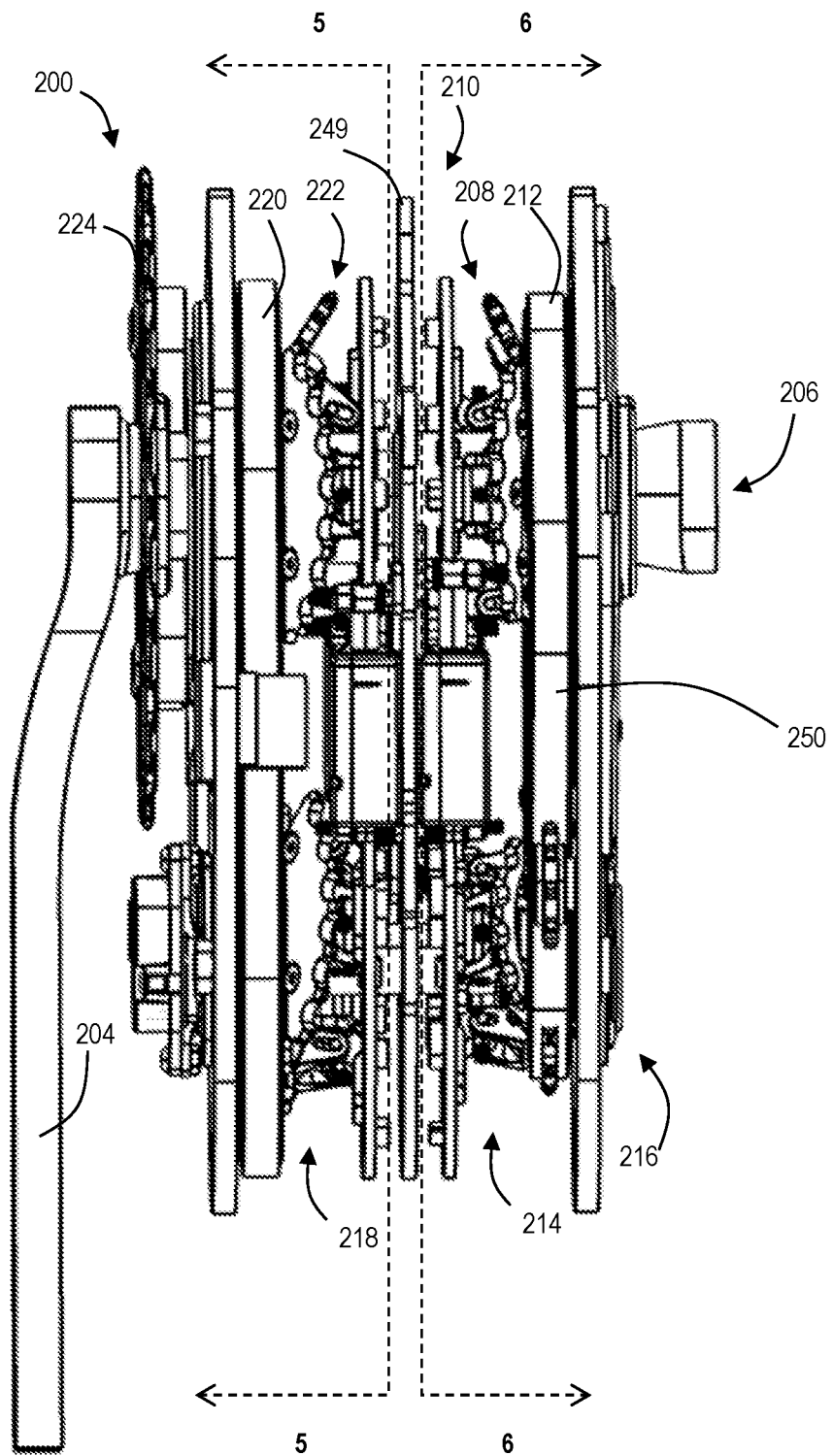
FIG. 4 is a top-down view of the gearbox of FIG. 2 with the housing removed.

FIG. 4 is a top view of gearbox 200. Gearbox 200 includes a layshaft 216 and four gear clusters: a first (input) gear cluster 208 (also referred to as cluster 1) disposed on a sheath 207 rotationally coupled to spindle 206, a second gear cluster 214 (also referred to as cluster 2) disposed on layshaft 216, a third gear cluster 218 (also referred to as cluster 3) disposed on layshaft 216, and a fourth gear cluster 222 (also referred to as cluster 4) disposed on an output shaft 223 (AKA a driven shaft), which is an example of output shaft 123. First gear cluster 208 is coupled to second gear cluster 214 by a first chain 212. Similarly, third gear cluster 218 is coupled to fourth gear cluster 222 by a second chain 220. Although chains are referred to herein, one or more belts (e.g., timing belts) may be used.

Accordingly, rotation of spindle 206 (e.g., by a bicycle rider operating pedals attached to the crankarms and/or by a motor) transmits power from first gear cluster 208 via first chain 212 to second gear cluster 214, and from the second gear cluster via the layshaft to third gear cluster 218. Second chain 220 transmits power from third gear cluster 218 to fourth gear cluster 222, and power is transmitted from the fourth gear cluster via output shaft 223 to chainring 224.

Each of the gear clusters may include a plurality of gears, one or more gears of the plurality of gears having a plurality of gear segments. Gears that have gear segments may be referred to as segmented gears. Each gear segment may be shaped as an annular sector. In some examples, each segmented gear comprises four gear segments, although more or fewer may be present. Each gear segment is pivotably attached to a hinge disposed near the center of the segmented gear.

One or more gear clusters may include a non-segmented sprocket having a smaller diameter than the respective segmented gear. Each gear segment pivots (or folds) in a direction transverse to the plane of the gear. In other words, each gear segment may transition between a coplanar position and a pivoted (AKA folded) position out of the original plane. This configuration enables the transition of a segmented gear (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

As shown in FIG. 4, a shifting system 210 is disposed at within gearbox 200, in a generally central location. Shifting system 210 is an example of shifting system 110 described above. A more detailed description of shifting system 210 is provided below, with respect to FIGS. 10-15. Alternatively, shifting system 310 may be utilized, a detailed description of shifting system 310 is provided in Section C with respect to FIGS. 28-32 below. Additionally, or alternatively, shifting system 410 may be utilized, as described in Section D below.

Figure 5:
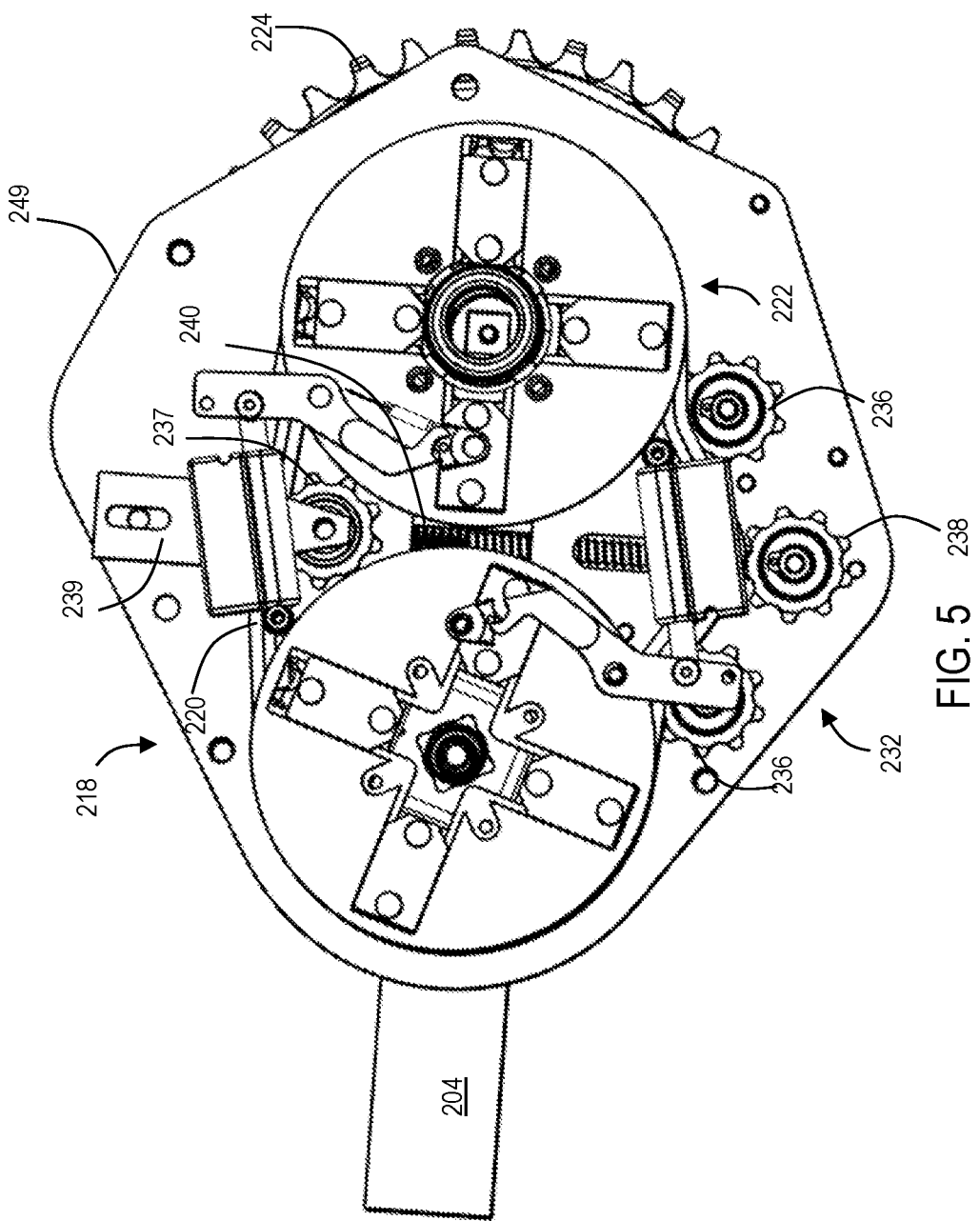
FIG. 5 is a sectional view of the gearbox of FIG. 2 taken along a line indicated in FIG. 4.

As shown in FIG. 5, gearbox 200 includes a first chain tensioner 232. First chain tensioner 232 includes at least one idler 236 having a fixed location, at least one idler 237 attached to an adjustable mounting bracket 239, and at least one adjustable gear 238 configured to be moved or translated by a pushrod 240. In the example shown in FIG. 5, first chain tensioner 232 includes two idlers. A spring is coaxially mounted to pushrod 240 to provide a biasing force.

First chain tensioner 232 may be configured to engage any of the chains described above. In the current example, idlers 236, 237 and gear 238 of first chain tensioner 232 are configured to engage chain 220. Accordingly, chain 220 interfaces with third gear cluster 218, fourth gear cluster 222, and chain tensioner 232.

First chain tensioner 232 is configured such that pushrod 240 can be utilized to linearly displace gears 238 with respect to idler 237, thereby applying more or less tension to the engaged chain. Manipulation of pushrod 240 may be manual (e.g., by a user), and/or may be automatic (e.g., using mechanical and/or electric components).

Figure 6:
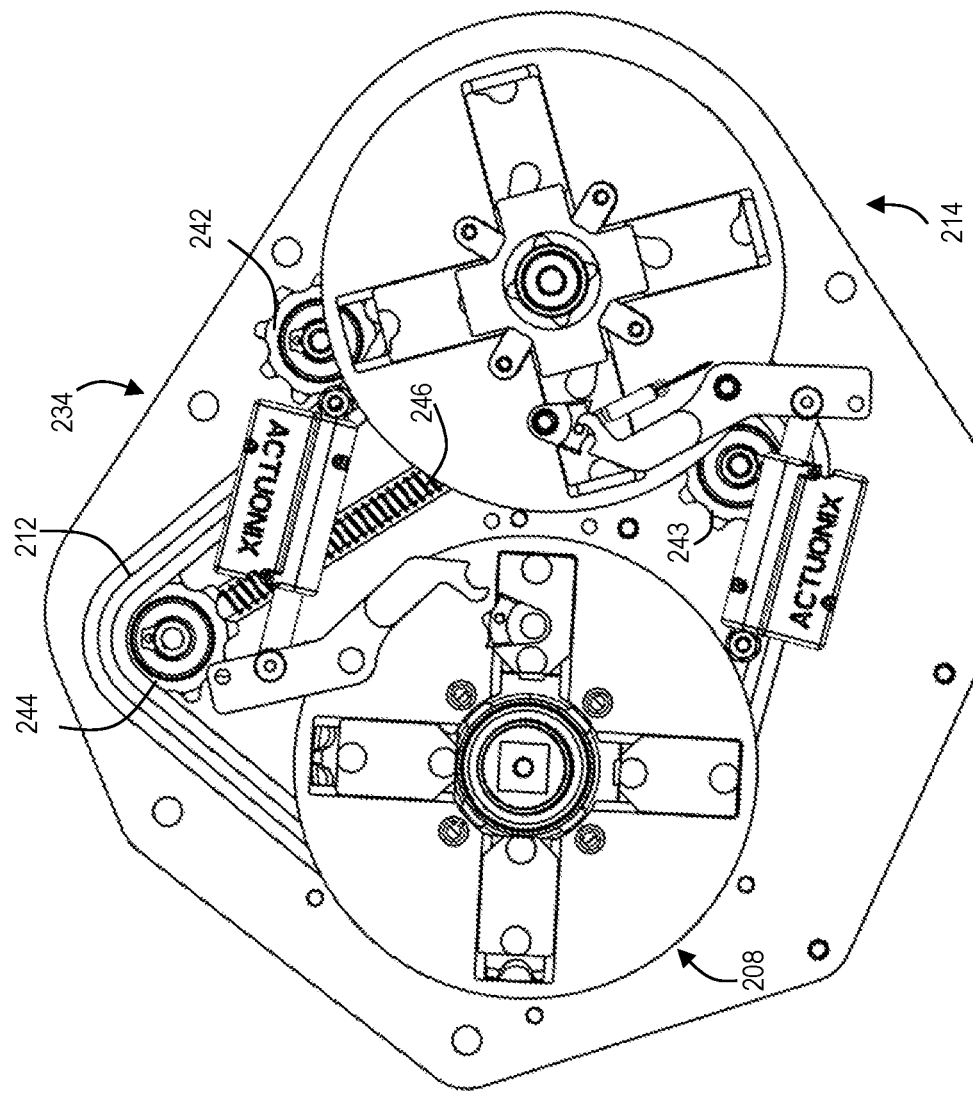
FIG. 6 is a sectional view of the gearbox of FIG. 2 taken along a line indicated in FIG. 4.

As shown in FIG. 6, first gear cluster 208 is coupled to second gear cluster 214 by first chain 212. The system is configured such that first chain 212 directly engages a single one of the gears of first gear cluster 208 and second gear cluster 214 at any given time; however, the chain may partially engage more than one of the gears of each cluster at some stages of operation, such as when the chain is being segmentally shifted from one gear to another (e.g., in response to user and/or controller input). Second gear cluster 214 is securely mounted on layshaft 216 (see above) such that rotation of second gear cluster 214 also rotates the layshaft.

Additionally, as shown in FIG. 6, gearbox 200 includes a second chain tensioner 234. Second chain tensioner 234 is configured to engage first chain 212. Accordingly, chain 212 is configured to interface with first gear cluster 208, second gear cluster 214, and chain tensioner 234.

In the example shown in FIG. 6, chain tensioner 234 includes an idler 242, a stationary gear 243, and an adjustable gear 244 attached to a pushrod 246. A spring is coaxially mounted to pushrod 246 to provide a biasing force.

Second chain tensioner 234 is configured such that pushrod 246 can be utilized to displace gear 244, thereby applying more or less tension to the engaged chain. Manipulation of pushrod 246 may be manual (e.g., by a user), and/or may be automatic (e.g., using mechanical and/or electric components).

Additionally, or alternatively, a rotary chain tensioner may be utilized. For example, a rotary chain tensioner may be utilized in the place of the first chain tensioner and/or the second chain tensioner. In some examples, the rotary chain tensioner may include one or more biasing mechanisms (e.g., coil springs, resilient fingers, etc.), the one or more biasing mechanisms configured to provide a restoring force to one or more idlers engaged with the chain(s).

Figure 7:
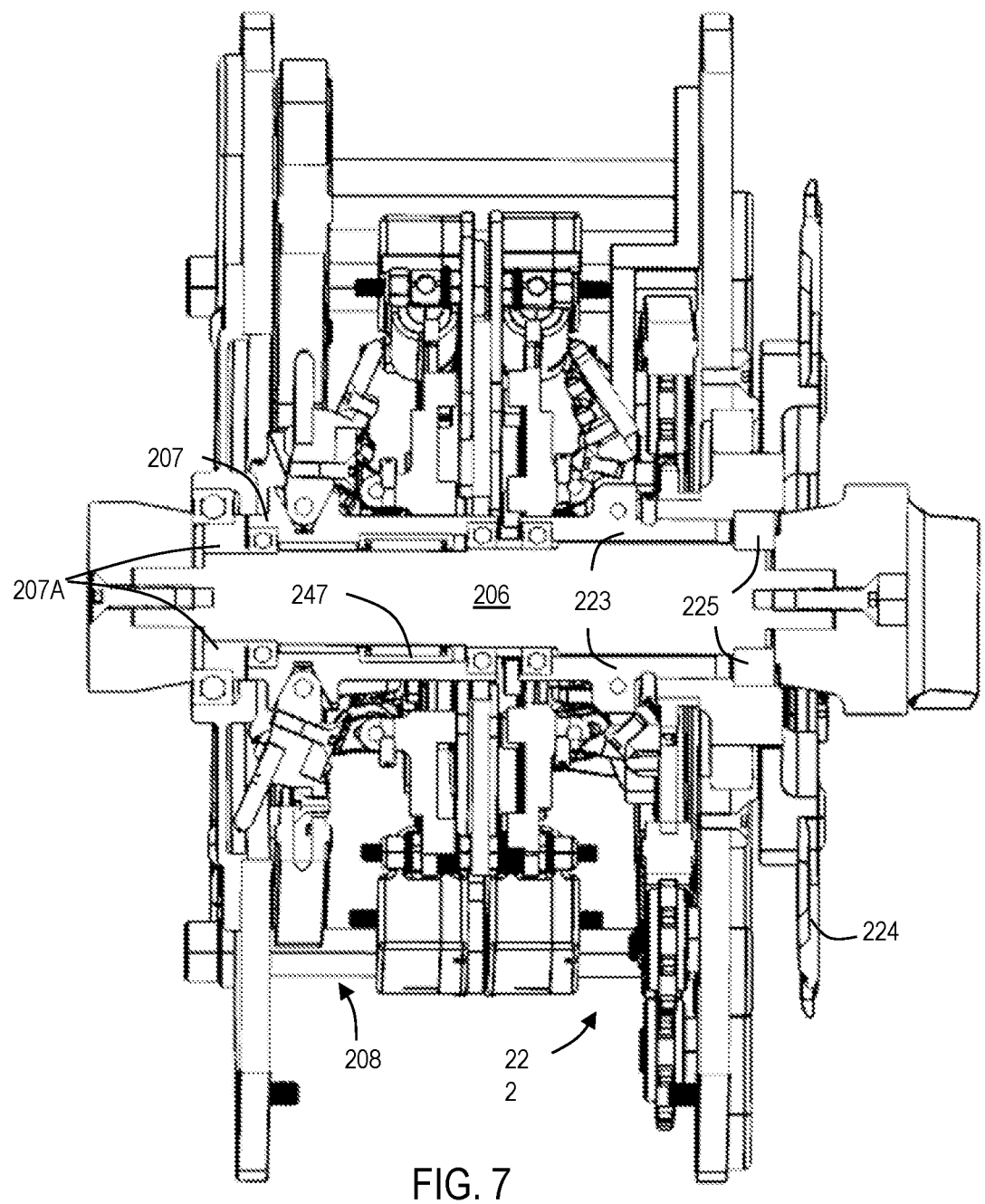
FIG. 7 is a sectional view of the gearbox of FIG. 2 taken along a line indicated in FIG. 3.

As shown in the sectional view of FIG. 7, gearbox 200 includes a sprag clutch 247 disposed coaxially between spindle 206 and sheath 207. Sprag clutch 247 is configured such that forward rotation of spindle 206 (e.g., by the pedaling of a user) causes a rotation of sheath 207 and thereby rotates first gear cluster 208. Conversely, sprag clutch 247 enables spindle 206 to freely rotate backwards without engaging sheath 207. In other words, sprag clutch 247 enables a user to pedal backwards without causing the gear clusters to similarly rotate backwards.

Figure 3:
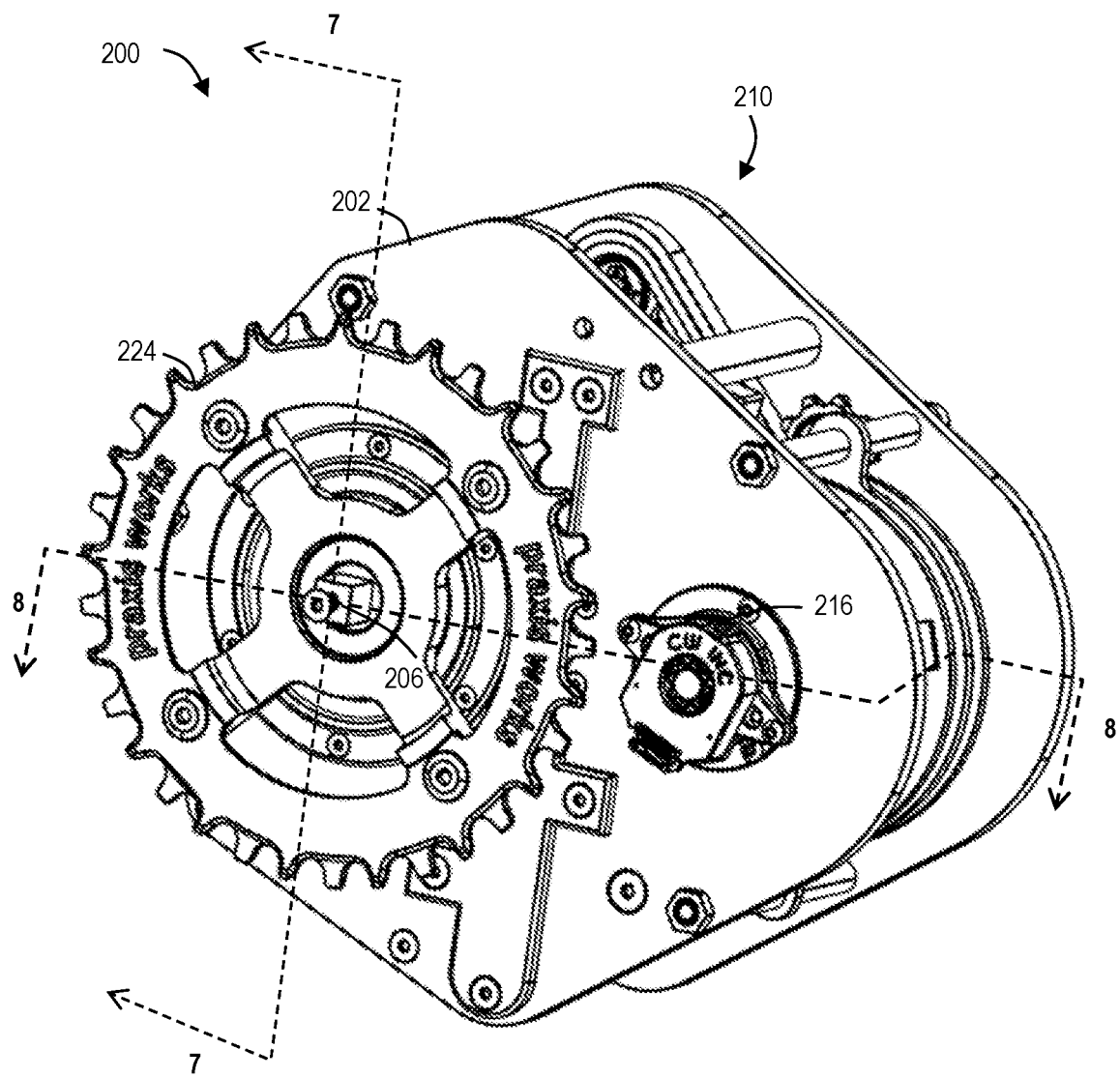
FIG. 3 is an isometric view of the gearbox of FIG. 2 with the crankarm removed.
Figure 8:
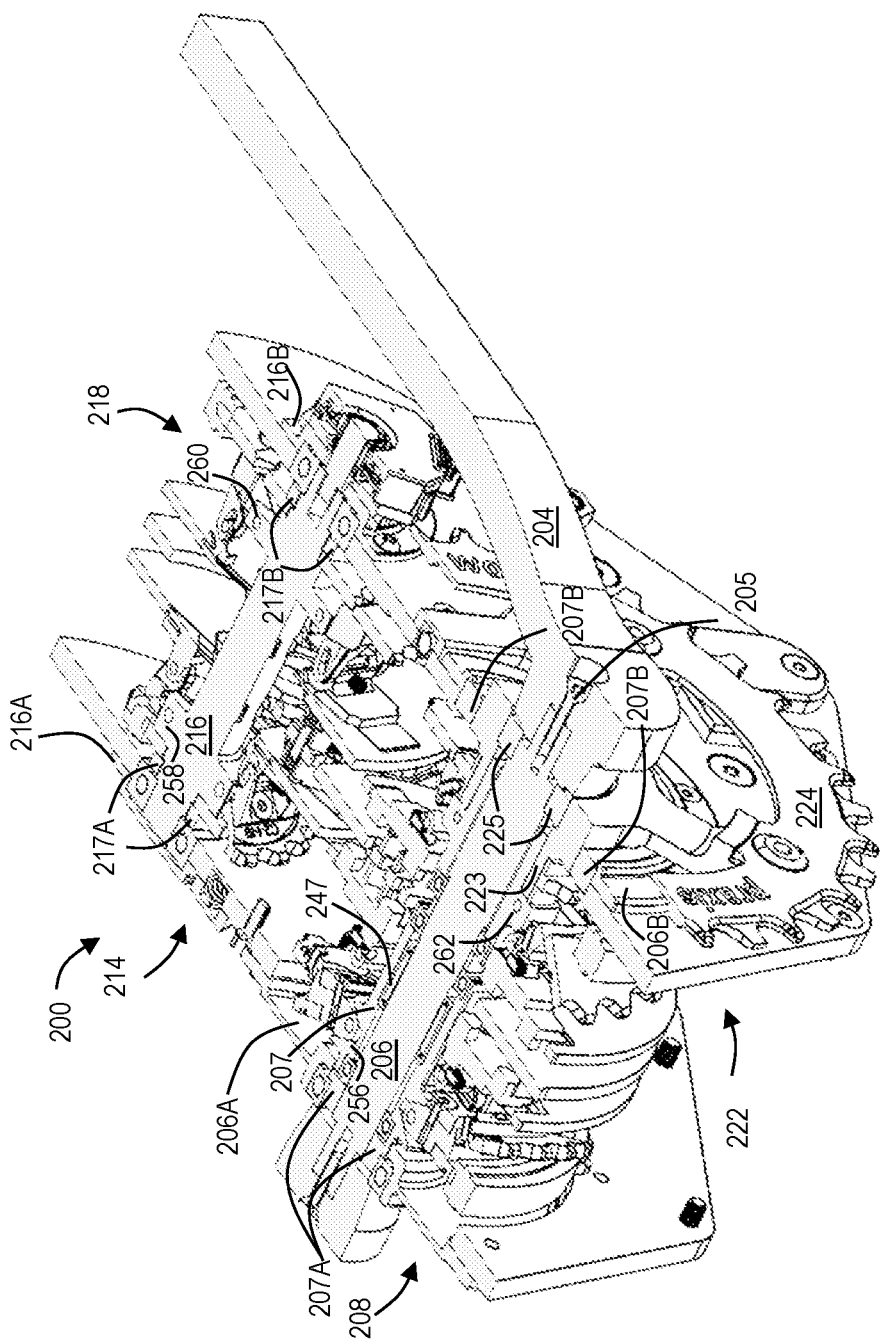
FIG. 8 is a sectional view of the gearbox of FIG. 2 taken along a line indicated in FIG. 3.

FIG. 8 depicts a sectional view of the gearing system of gearbox 200 taken at line 8-8 of FIG. 3. Crankarm 204 is coupled to spindle via crank screw 205. Output shaft 223 is situated coaxially on an end of spindle 206 and rotationally isolated from the spindle by bearings 225.

Disposed at one end of spindle 206 is a flange 206A and disposed at the opposite end, encircling output shaft 223 is a flange 206B. Spindle 206 is rotationally isolated from flange 206A via bearing 207A, and similarly, output shaft 223 is rotationally isolated from flange 206B via bearing 207B.

Similarly, disposed at one end of layshaft 216 is a flange 216A and disposed at the opposite end is a flange 216B. Layshaft 216 is rotationally isolated from flange 216A via bearing 217A, and similarly, layshaft 216 is rotationally isolated from flange 216B via bearing 217B.

In the current example, first gear cluster 208 comprises two segmented gears, 208A and 208B. Affixed to each gear segment of segmented gear 208A is a hinge knuckle 211. Each gear segment of segmented gear 208A additionally shares a common hinge portion 209 with a corresponding gear segment of segmented gear 208B, in a fixed angular relationship. Hinge portion 209 is configured to mate with a hinge receiver 256 disposed on sheath 207. Hinge receiver 256 may be unitary with sheath 207 or may be affixed by a suitable mechanism (e.g., screws, friction fit, etc.). Corresponding segments of the two gears are configured to pivot together, rather than independently (see FIGS. 16-18). In other words, when a segment of gear 208A is shifted out of the plane of chain 212, the corresponding segment of 208B is brought into the plane of chain 212 (thereby engaging the chain).

First gear cluster 208 is coupled to second gear cluster 214 by first chain 212. The system is configured such that first chain 212 directly engages a single one of the gears of first gear cluster 208 and a single one of the gears of second gear cluster 214 at any given time; however, the chain may partially engage more than one of the gears of each cluster at some stages of operation, such as when the chain is being segmentally shifted from one gear to another (e.g., in response to user and/or controller input).

Second gear cluster 214 is securely mounted on layshaft 216 such that rotation of second gear cluster 214 also rotates the layshaft. Second gear cluster 214 has a nested arrangement, such that a segmented gear 214A and a non-segmented sprocket 214B are nestable together (see FIGS. 19-21). Sprocket 214B mates with layshaft 216 in the space between hinge receiver 258 and flange 216A. Similarly, sprocket 218B mates with layshaft 216 in the space between hinge receiver 260 and flange 216B. Affixed to the inboard face of each gear segment of segmented gear 214A is a hinge knuckle 217. Each gear segment of segmented gear 214A includes a hinge portion 215 coupled to a hinge receiver 258 disposed on layshaft 216. Hinge receiver 258 may be unitary with layshaft 216 or may be affixed by a suitable fastening mechanism (e.g., screws, friction fit, etc.).

Figure 22:
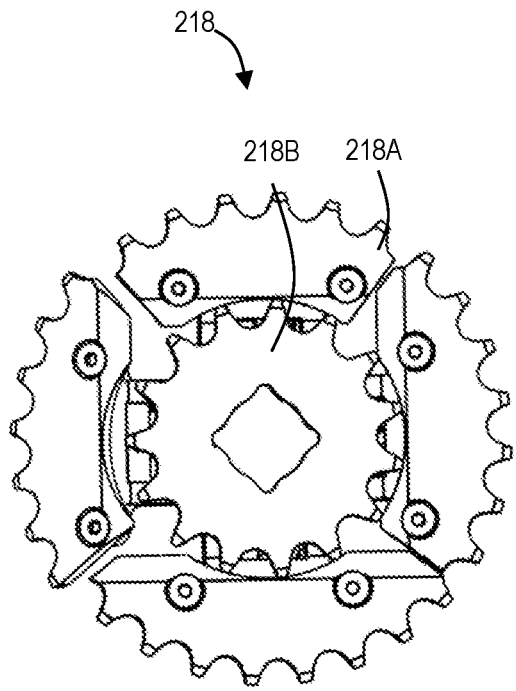
FIG. 22 is a front view of an illustrative third gear cluster in accordance with aspects of the present disclosure.
Figure 24:
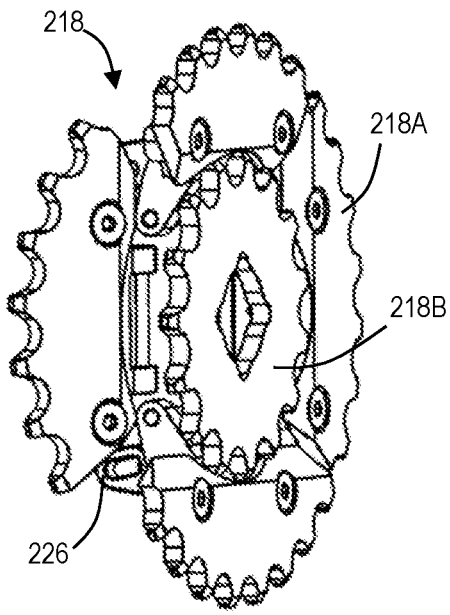
FIG. 24 is an isometric view of the gear cluster of FIG. 22.

Third gear cluster 218 comprises a segmented gear 218A and a non-segmented sprocket 218B nestable therein (see FIGS. 22-24). Affixed to the inboard face of each gear segment of segmented gear 218A is a hinge knuckle 226. Each gear segment of segmented gear 218A includes a hinge portion 219 coupled to a hinge receiver 260 disposed on layshaft 216. Hinge receivers 258 and 260 may be unitary with layshaft 216 or may be affixed by a suitable mechanism (e.g., screws, friction fit, etc.).

Third gear cluster 218 is configured to engage second chain 220. Second chain 220 couples a selected one of the gears to fourth gear cluster 222, thereby transmitting rotation of third gear cluster 218 to fourth gear cluster 222. Typically, second chain 220 directly engages a single one of gears of third gear cluster 218 and fourth gear cluster 222 at any given time; however, the chain may engage more than one of the gears of the clusters at some stages of operation, such as when the chain is being shifted from one gear to another (e.g., in response to user and/or controller input).

Fourth gear cluster 222 is securely mounted on output shaft 223 such that the output shaft rotates with the fourth gear cluster. Fourth gear cluster 222 comprises a segmented gear 222A and a non-segmented sprocket 222B (see FIGS. 25-27). Affixed to the inboard face of each gear segment of segmented gear 222A is a hinge knuckle 227. Sprocket 222B includes an opening for mating with output shaft 223. Each gear segment of segmented gear 222A includes a hinge portion 221 configured to mate with a hinge receiver 262 disposed on output shaft 223. Hinge receiver 262 may be unitary with output shaft 223 or may be attached by a suitable mechanism (e.g., screws, friction fit, etc.).

Hollow output shaft 223 (AKA an output sleeve) surrounds and is coaxial with spindle 206, such that the output shaft and the spindle are freely able to rotate independently of one another. Output shaft 223 is affixed to chainring 224 (e.g., by a spider), such that the chainring rotates with the output shaft independently of the spindle. Chainring 224 thus transmits power from gearbox 200 to an external system, typically a rear wheel of a bicycle or another suitable wheel or vehicle.

Gearbox 200 utilizes a shifting system for transitioning the segmented gears between the coplanar configuration and the pivoted configuration. In general, gearbox 200 may utilize shifting system 210 described immediately below, or any other suitable system described herein, such as shifting system 310 described in Section C with respect to FIGS. 28-32 below, or shifting system 410, as described in section D below.

Figure 9:
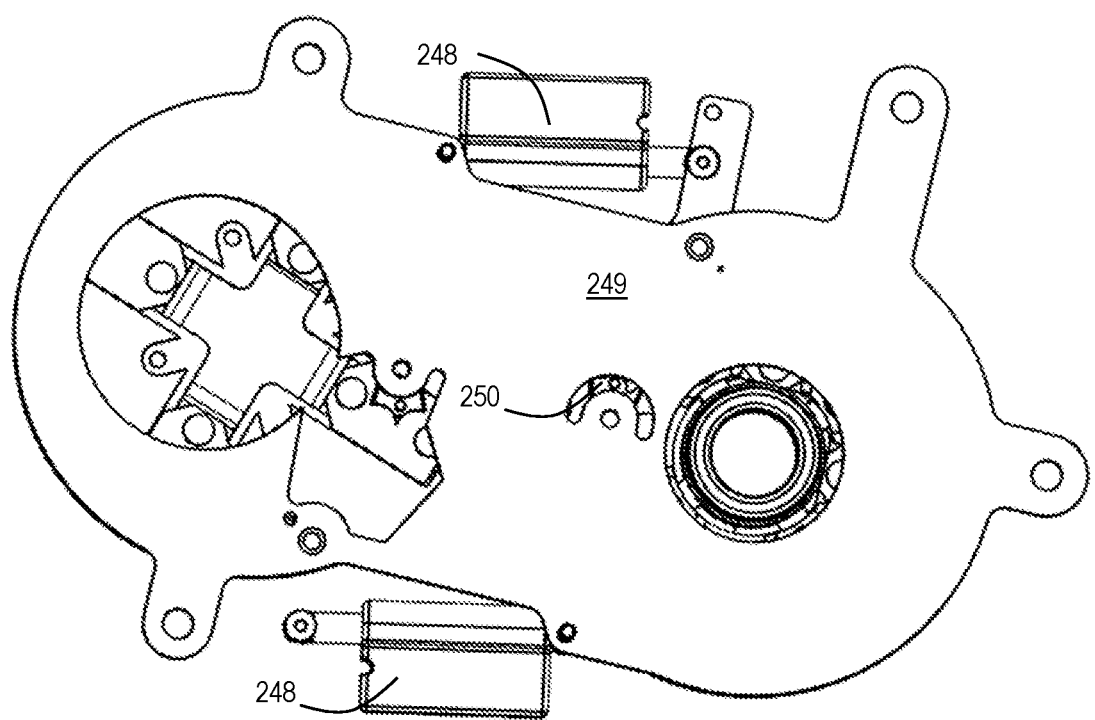
FIG. 9 is a profile view of an illustrative shifting system with a toggle and lever for use with the gearbox of FIG. 2.

Turning now to FIG. 9, shifting system 210 is depicted. Shifting system 210 includes a plurality of actuators 248 and a plurality of toggles 250, each of the actuators and toggles coupled to a mounting plate 249. Mounting plate 249 is disposed at a central location in gearbox 200, such that one actuator and one toggle correspond to each of the four gear clusters. Each actuator 248 may include a respective linear actuator (e.g., under control of an electronic controller and/or a user) coupled to a pivoting actuator arm.

Figure 10:
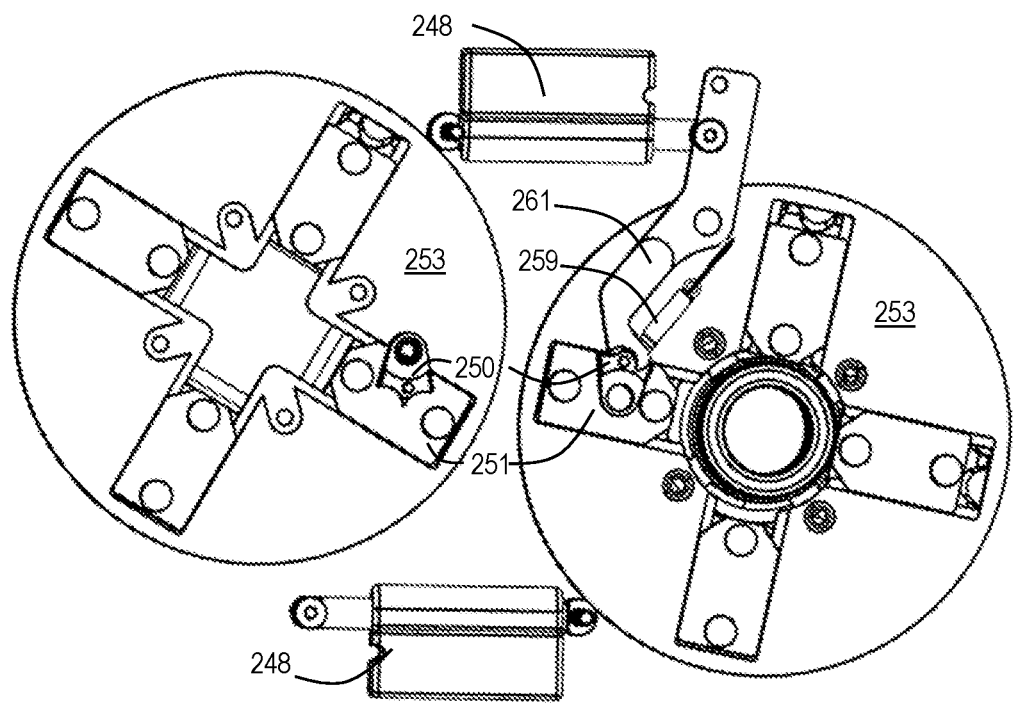
FIG. 10 is a profile view of the shifting system of FIG. 9 with the mounting plate removed.
Figure 11:
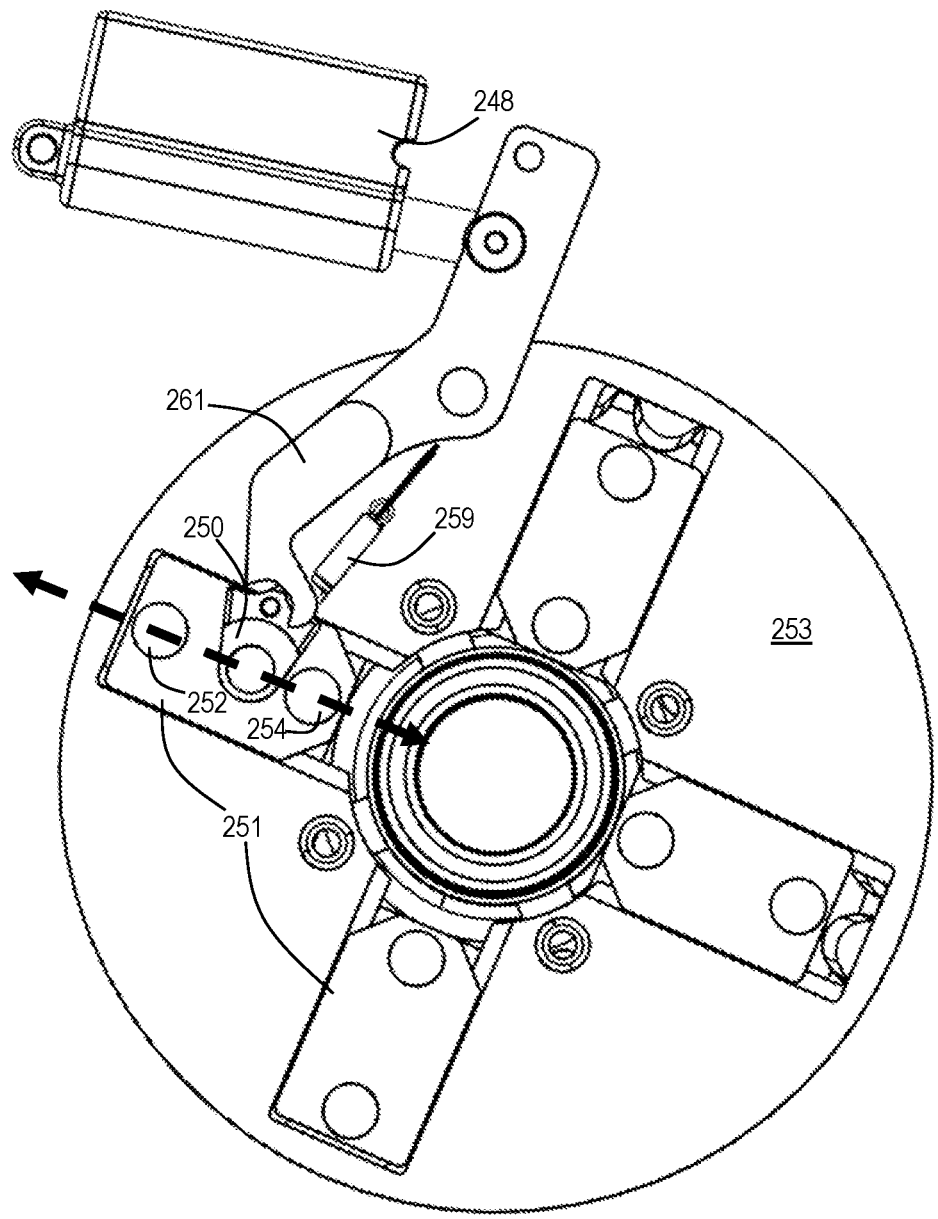
FIG. 11 is a profile view of the shifting system of FIG. 9 for use with a single gear cluster.

As shown in FIGS. 10 and 11, actuator 248 is configured to engage and manipulate toggle 250. Toggle 250 is configured to selectively and mechanically interface with portions of a plurality of shifting sliders 251 seated within a guiding plate 253. Each shifting slider is coupled to a gear segment of each of the segmented gears (e.g., segmented gears 208A, 214A, 218A, and 222A).

Shifting slider 251 includes a pair of protrusions referred to herein as first protrusion 252 and second protrusion 254, generally configured such that rotation of the corresponding gear cluster causes the shifting slider 251 to rotate, thus bringing first and second protrusions 252, 254 to opposing sides of toggle 250. Actuator 248 is configured to selectively transition between two positions, e.g., by way of a linear actuator under control of an electronic controller, thereby causing toggle 250 rotate, by way of lever 261, between two corresponding positions—one position for each of first and second protrusions 252, 254. The two positions of toggle 250 are herein referred to as a first position and a second position.

When toggle 250 is in the first position, rotation of the gear cluster (and therefore guiding plate 253 and shifting slider 251) causes toggle 250 to strike first protrusion 252 thereby pushing shifting slider 251 in a generally outward direction. Conversely, when toggle 250 is in the second position, rotation of the gear cluster causes toggle 250 to strike second protrusion 254 thereby pushing shifting slider 251 in a generally inward direction. In other words, actuator 248 and toggle 250 are configured to selectively transition shifting slider 251 in a radial direction between two positions, e.g., along the arrow in FIG. 11.

A retention spring 259 is configured to provide a biasing force on toggle 250, such that toggle 250 is retained in a neutral position resting against lever 261 when toggle 250 is not engaging first or second protrusions 252, 254. Retention spring 259 and toggle 250 are configured such that the neutral position of toggle 250 corresponds to the toggle being between generally between first and second protrusions 252, 254. In the neutral position, toggle 250 does not engage (i.e., strike) either the first or second protrusions. In other words, when toggle 250 is in the neutral position, the gear ratio of the corresponding gear cluster is not changed. Additionally, retention spring 259 enables toggle 250 to stay generally immobile when gearbox 200 is agitated or otherwise jolted.

After shifting slider 251 is transitioned to either of the two positions, the protrusions pass toggle 250 and the biasing force of retention spring 259 returns toggle 250 to the neutral position. As shown in FIGS. 54 and 55, each shifting slider 251 is coupled to a gear segment of the segmented gears.

The linear translation of shifting slider 251 between the two positions causes the respective gear segment to rotate between the coplanar and pivoted positions described above. In the example depicted in FIGS. 51-55, the first position of toggle 250 corresponds to the coplanar position of the segmented gears. Accordingly, the second position of toggle 250 corresponds to the pivoted position of the segmented gears.

Figure 14:
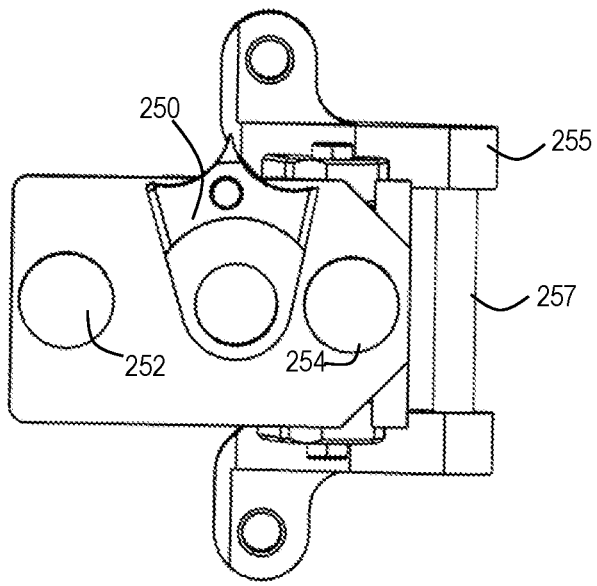
FIG. 14 is a front view of an illustrative shifting slider and toggle of the shifting system of FIG. 9.
Figure 15:
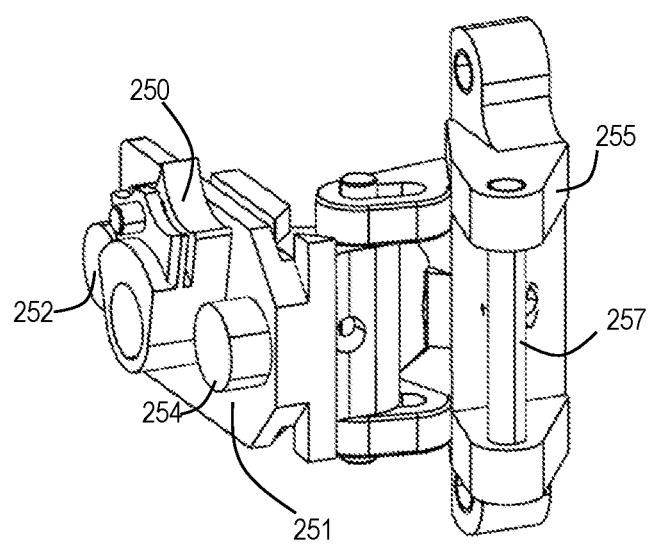
FIG. 15 is an isometric view of the shifting slider and toggle of FIG. 14.

As shown in FIGS. 14 and 15, each shifting slider 251 is coupled to a hinge 255 having a hinge pin 257. Shifting slider 251 and hinge 255 have a fixed relationship such that linear translation of shifting slider 251 causes rotation of hinge 255. Each hinge knuckle of the corresponding gear segments (i.e., hinge knuckles 211, 217, 226, 227) is configured to couple to hinge pin 257. This configuration enables the transition of the segmented gears between the coplanar and pivoted positions by the translation of the shifting slider as described above.

FIGS. 16-27 depict the first, second, third, and fourth gear clusters in isolation.

Figure 16:
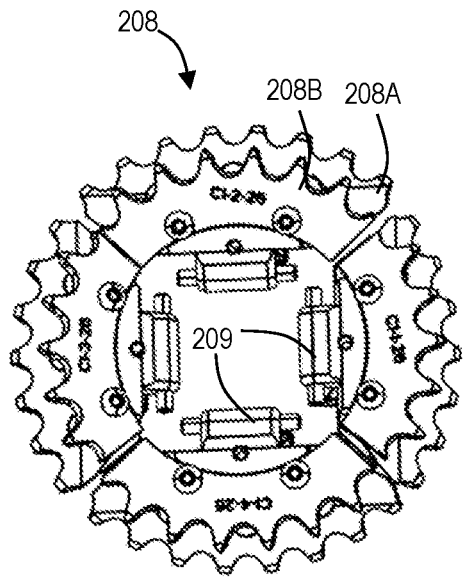
FIG. 16 is a front view of an illustrative first gear cluster in accordance with aspects of the present disclosure.
Figure 17:
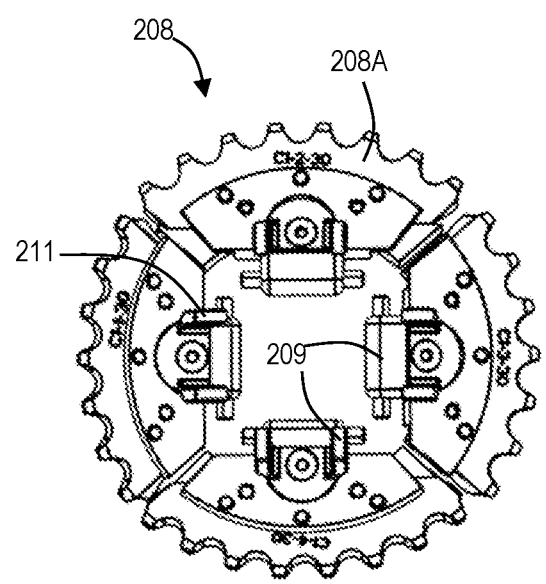
FIG. 17 is a rear view of the gear cluster of FIG. 16.
Figure 18:
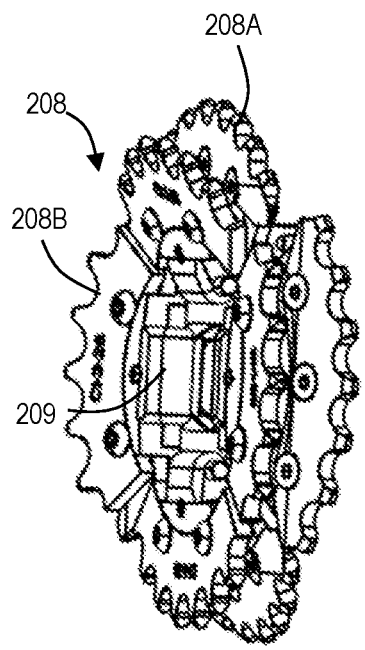
FIG. 18 is an isometric view of the gear cluster of FIG. 16.

As shown in FIGS. 16-18, first gear cluster 208 comprises a plurality of segmented gears having different diameters. In the current example, first gear cluster 208 comprises two gears (one inboard and one outboard). In another example, the first gear cluster may comprise more or fewer gears. Gears are arranged within first gear cluster 208 from largest-diameter gear to smallest-diameter gear. Each segment of the segmented gear 208A shares a hinge with a corresponding segment of segmented gear 208B.

Figure 19:
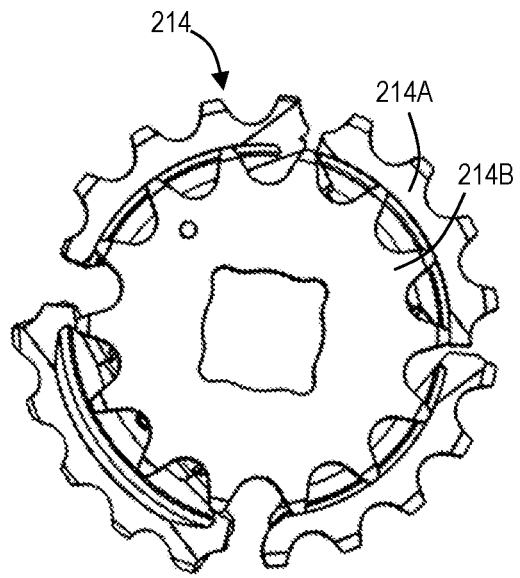
FIG. 19 is a front view of an illustrative second gear cluster in accordance with aspects of the present disclosure.
Figure 20:
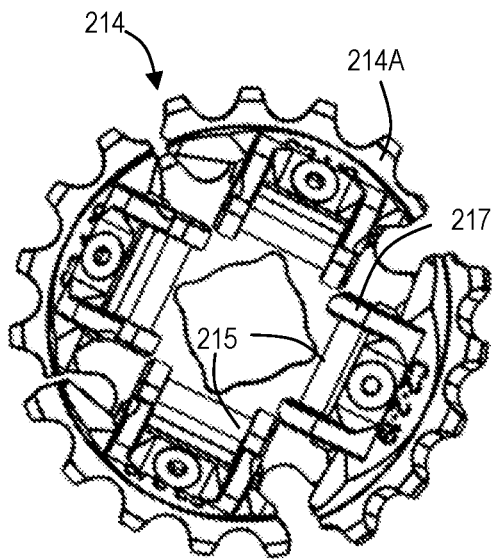
FIG. 20 is a rear view of the gear cluster of FIG. 19.
Figure 21:
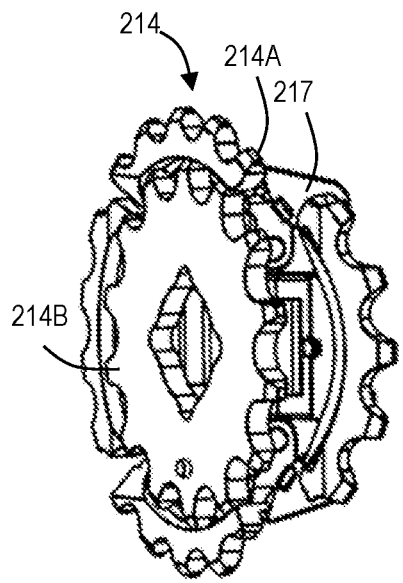
FIG. 21 is an isometric view of the gear cluster of FIG. 19.

As shown in FIGS. 19-21, second gear cluster 214 comprises a sprocket or cog (e.g., a single non-segmented gear) having a first diameter and a segmented gear having a second (larger) diameter, the segmented gear being capable of transitioning into and out of the same plane as the smaller sprocket.

As shown in FIGS. 22-24, third gear cluster 218 includes a non-segmented cog or sprocket having a first diameter and a segmented gear having a second (larger) diameter, the segmented gear being capable of transitioning into and out of the same plane as the smaller sprocket.

Figure 25:
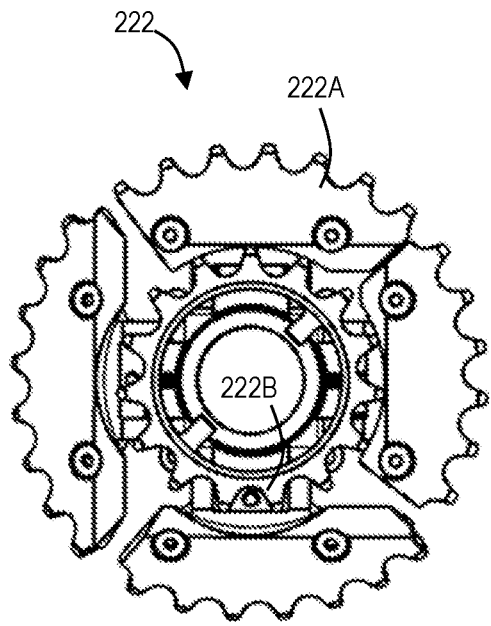
FIG. 25 is a front view of an illustrative fourth gear cluster in accordance with aspects of the present disclosure.
Figure 26:
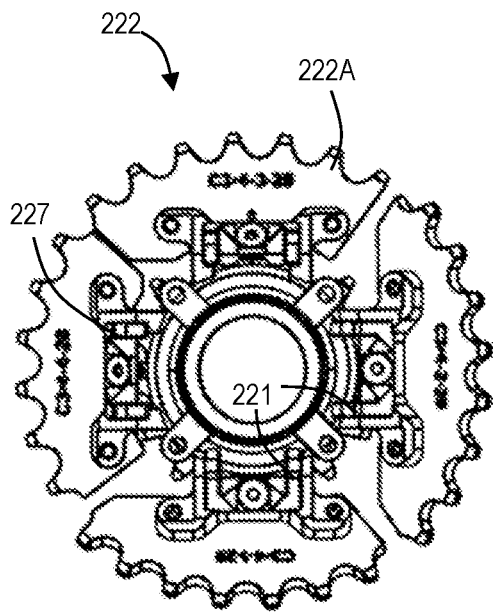
FIG. 26 is a rear view of the gear cluster of FIG. 25.
Figure 27:
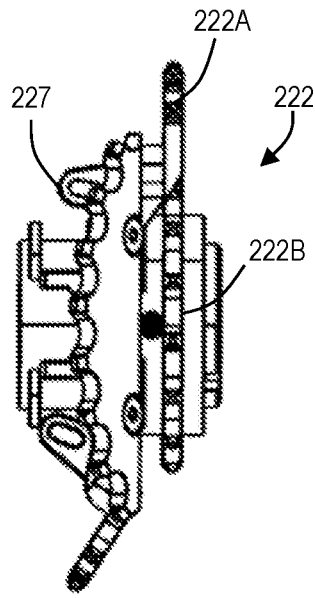
FIG. 27 is an isometric view of the gear cluster of FIG. 25.

As shown in FIGS. 25-27, fourth gear cluster 222 comprises a cog having a first diameter and a segmented gear having a second (larger) diameter, the segmented gear being capable of transitioning into and out of the same plane as the smaller sprocket.

In the current example, gearbox 200 includes two gear options for first gear cluster 208, corresponding to gears 208A and 208B. These options may be identified as A1 and A2, respectively. In the current example, gearbox 200 includes two gear options for second gear cluster 214, corresponding to gears 214A and 214B. These options may be identified as B1 and B2, respectively. In the current example, gearbox 200 includes two gear options for third gear cluster 218, corresponding to gears 218A and 218B. These options may be identified as C1 and C2, respectively. In the current example, gearbox 200 includes two gear options for fourth gear cluster 222, corresponding to gears 222A and 222B. These options may be identified as D1 and D2, respectively.

A combination of any one of the gear options of the first gear cluster 208, any one of the gear options of second gear cluster 214, any one of the gear options for third gear cluster 218, and any one of the gear options for fourth gear cluster 222 determines a gear ratio of gearbox 200. Each combination of the available options may be referred to as a "gear" and/or "speed" of the vehicle that includes gearbox 200.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the chain with a different gear.

C. Illustrative Shifting System with Cam and Lever

This section describes a shifting system 310. See FIGS. 28-32. Shifting system 310 is configured to be utilized in gearbox 100 and/or gearbox 200 as a direct replacement for shifting system 110 and/or shifting system 210, respectively. Shifting system 310 is analogous to shifting system 210, with differences described below. Additionally, or alternatively, shifting system 310 may be utilized with any drivetrain including a pivoting segmented gear and/or segmented gear cluster (i.e., independent of a gearbox). For example, shifting system 310 may be utilized in the drivetrain of a bicycle, electric bicycle, or motorcycle having one or more segmented chainrings and/or cassette cogs.

The shifting system includes a pivoting cam configured to interact with a respective segment actuator of each of the segments of a gear cluster. This cam causes each of the segments of the gear to selectively transition into and out of the plane of the belt or chain, such that the belt or chain is switched to a different gear (e.g., having a different diameter) without displacing the belt or chain out of its plane. In this example, the cam is selectively pivoted using a linear actuator and lever arm, although other methods may be utilized. The segment actuators rotate with the segmented gear, while the cam does not, instead pivoting about an axis that is stationary with respect to the rotating gear.

In the present example, each segment actuator includes a slider configured to translate radially in a guide plate that rotates with the gear cluster, the slider being coupled to the respective gear segment by a slip joint or slotted hinge mechanism. Radial translation of the slider is caused when one or more pegs or protrusions of the slider rotate into contact with the cam, and a ramped face or edge of the cam urges the peg (and therefore the slider) in a radial direction. Because the slider is connected to the segment by the slotted hinge, this translation causes the segment to pivot on its pivot axis (see FIGS. 31, 32).

As with other shifting systems described herein, the cam is disposed such that each segment actuator interfaces with (and is repositioned by) the cam at a rotational position that pivots the segment when the segment is unloaded, i.e., not encumbered by the belt or chain. Furthermore, the cam in this example need not be repositioned between segment actuations or after all segments have been pivoted into or out of the plane. The cam simply remains in its existing configuration until further pivoting of the segments is called for. Accordingly, each gear cluster may be operated without a need for position sensors or other methods of ascertaining the rotational position of the gear cluster or of the tilted state of the gear segments.

Shifting system 310 includes one or more actuators 348 coupled to a mounting plate and one or more cams 350 (also referred to as wedges) manipulated by the actuators to cause shifting of the gear segments. In some examples, the mounting plate is disposed at a central location in gearbox 300, such that one actuator corresponds to each of the four gear clusters (e.g., see FIG. 4 and corresponding mounting plate 249 above). Each actuator 348 may include any suitable actuator configured to shift the associated cam between two or more positions, as described below. In the present example, actuator 348 includes a linear actuator (e.g., under control of an electronic controller and/or a user) coupled to the cam by a pivoting lever 361. In some examples, actuator 348 is an electro-mechanical linear actuator. Actuator 348 may include a piezoelectric linear actuator, a screw-type actuator, a cylinder and piston, a step motor, a pneumatic actuator, and/or the like.

Figure 28:
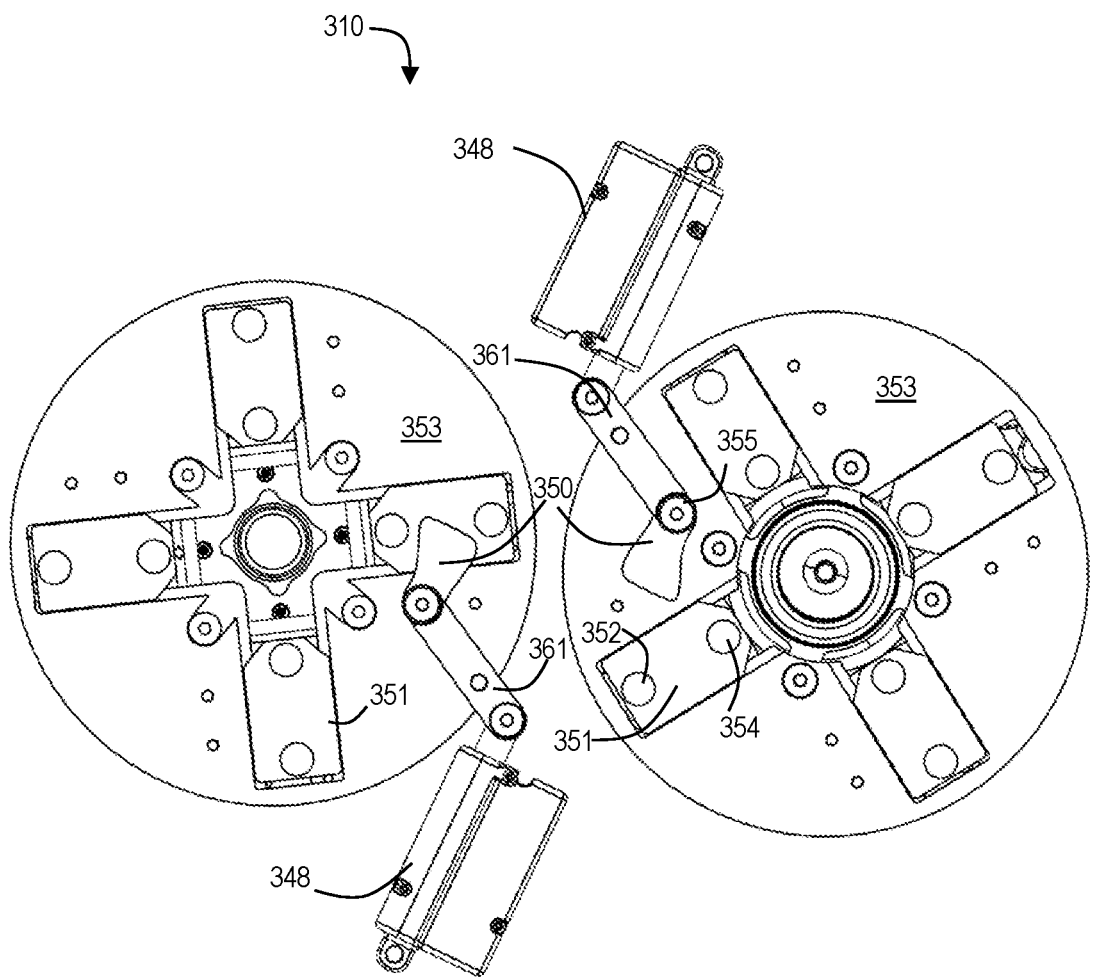
FIG. 28 depicts an illustrative shifting system with a cam and a lever for use with gearboxes of the present disclosure.

As shown in FIG. 28, actuator 348 is configured to engage and manipulate cam 350 via lever 361. Cam 350 and lever 361 pivot or rotate together about a fixed pivot 355, such that extending and retracting actuator 348 causes cam 350 to transition between two operative positions. In some examples, cam 350 and lever 361 are unitary and/or formed as a single piece. In some examples, cam 350 and lever 361 are coupled together, e.g., by way of a third structure. Cam 350 is configured to selectively mechanically interface with corresponding portions of a plurality of shifting sliders 351 seated within a rotating guiding plate 353, as described further below. Pivot 355 has an axis of rotation generally parallel to the axis of rotation of the guiding plate.

Figure 29:
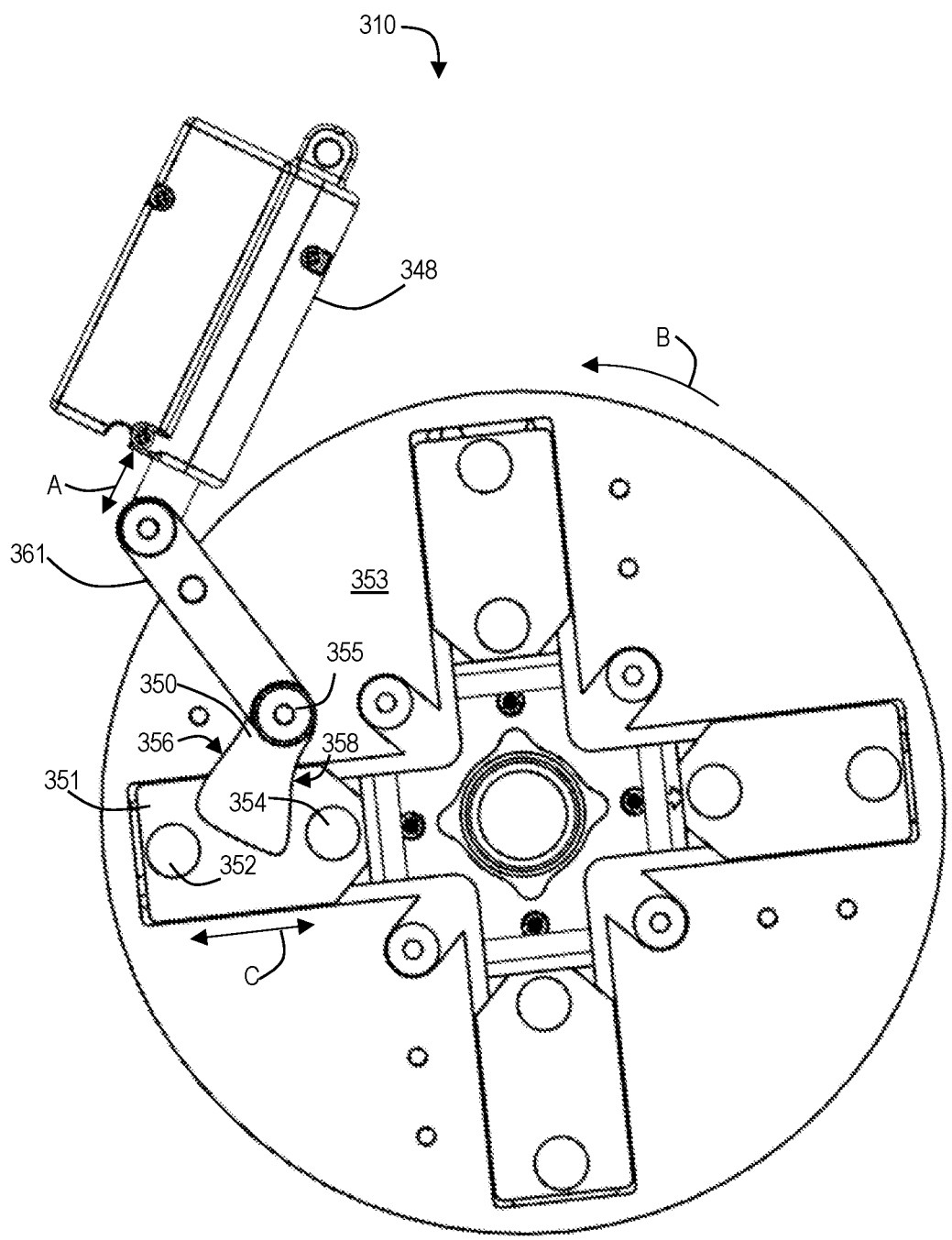
FIG. 29 depicts the shifting system of FIG. 28 for use with a single gear cluster in a first position.
Figure 30:
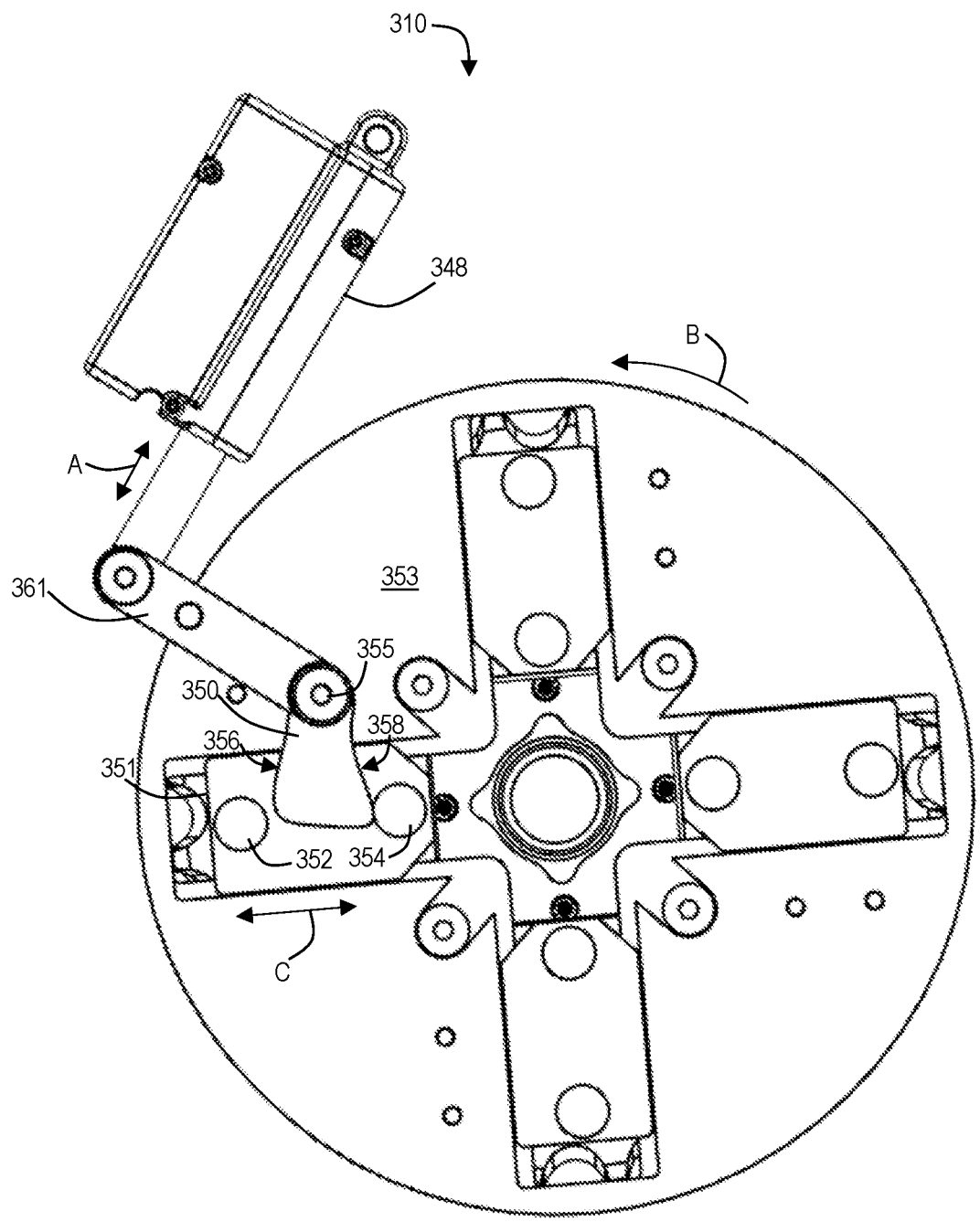
FIG. 30 depicts the shifting system of FIG. 28 for use with a single gear cluster in a second position.

Turning to FIGS. 29 and 30, system 310 is shown in FIG. 29 with cam 350 in a first configuration or position, and in FIG. 30 with cam 350 in a second configuration or position. Cam 350 includes a pair of ramped faces referred to herein as a first ramped face 356 and a second ramped face 358. In the example depicted in FIGS. 29 and 30, cam 350 has an asymmetrical lobe profile with lateral edges generally configured to have a curvilinear contour, in which opposing edges form the first and second faces. In operation, the extension of linear actuator 348 along the direction indicated by arrow A causes lever 361 and cam 350 to pivot about fixed pivot 355, thereby causing a change in the position and orientation of cam 350 (and therefore first and second faces 356, 358).

Fixed pivot 355 may be rotatably fixed to the mounting plate, a housing of the gearbox, or both, such that the pivot remains at a fixed location in the gearbox, even when other components (such as guiding plate 353) are rotated. Cam 350 may be selectively positioned in this manner into one of two states, herein referred to as a first state and a second state. For reference, cam 350 is shown in its first state in FIG. 29 and its second state in FIG. 30.

Each shifting slider 351 includes a pair of protrusions, first protrusion 352 and second protrusion 354, manipulated by the cam to operably translate the shifting slider in the direction indicated by arrow C. First and second protrusions 352, 354 disposed at distally opposite locations on the slider such that the first and second protrusions are brought to opposing sides of cam 350 as the gear cluster is rotated in the direction indicated by arrow B. First and second protrusions 352, 354 and shifting slider 351 may be unitary and/or formed as a single piece. In some examples, the shifting slider and protrusions comprise a durable plastic (e.g., polyethylene, polyvinyl chloride (PVC), polyethylene terephthalate (PET), etc.), metal/metallic alloy (aluminum, titanium, steel, etc.), and/or another suitably durable material.

Figure 12:
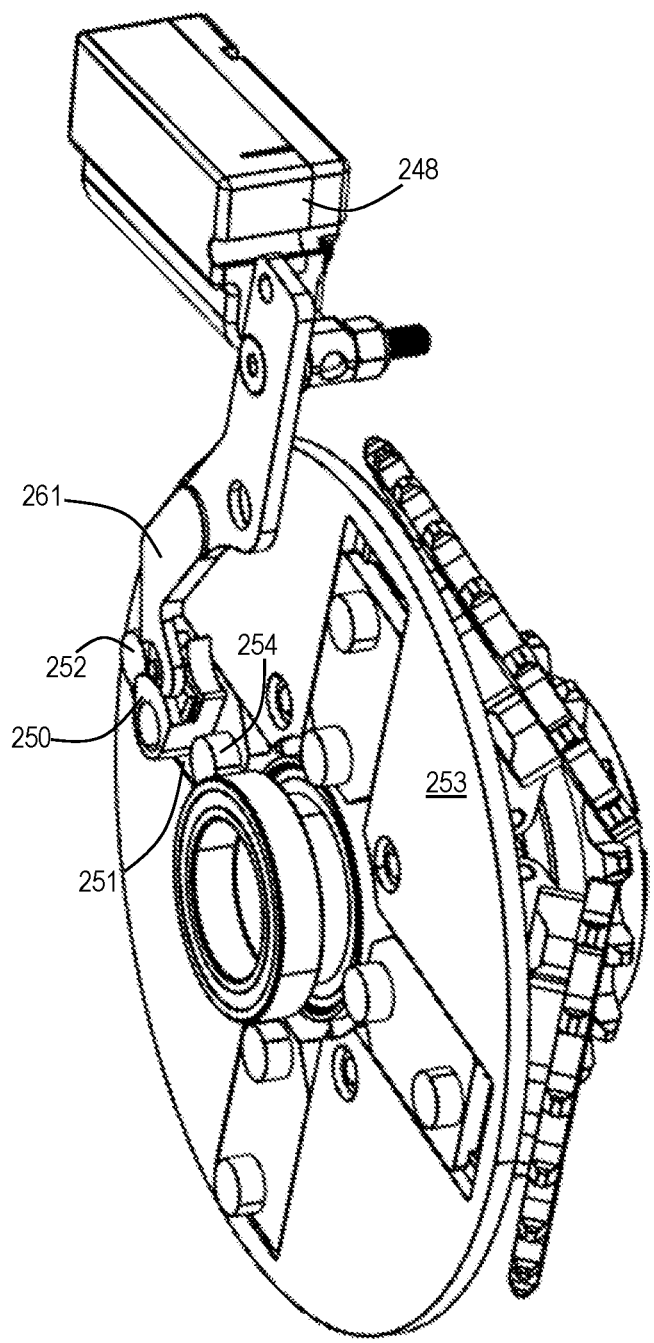
FIG. 12 is an isometric view of the shifting system of FIG. 11 further depicting an illustrative gear cluster.
Figure 13:
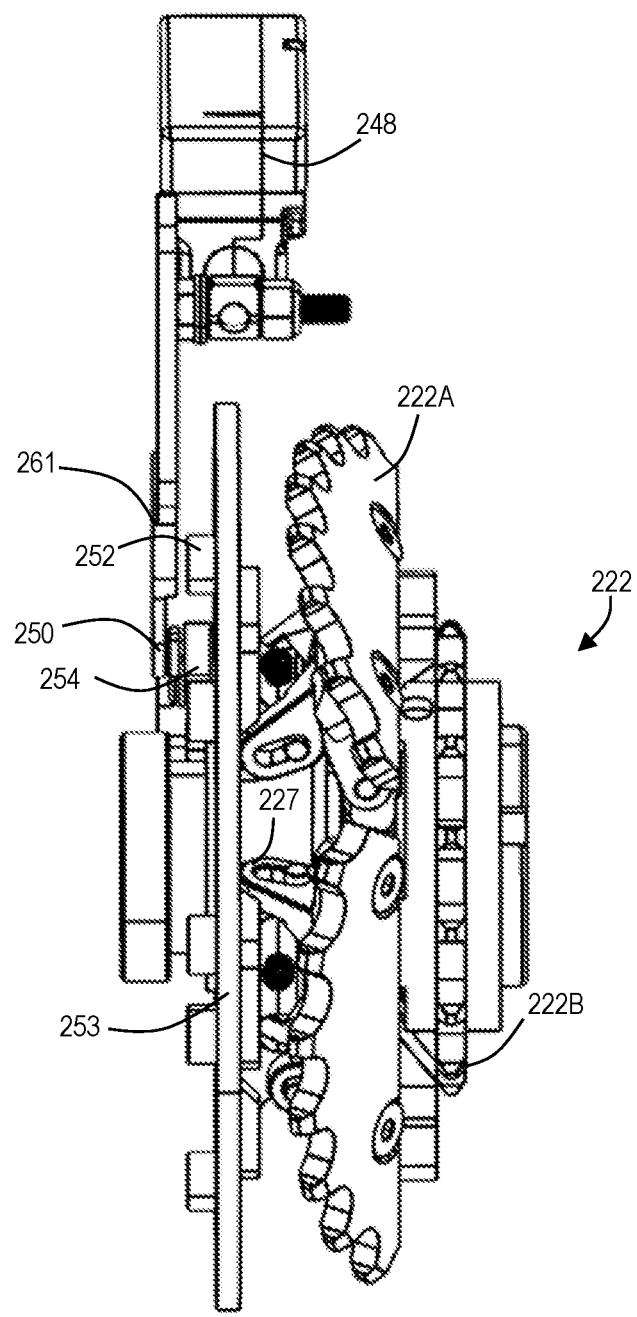
FIG. 13 is a front view of the shifting system of FIG. 11 further depicting a gear cluster.

Similar to the description in Section B, with respect to FIGS. 11-13, each shifting slider 351 is coupled to a hinge of a respective gear segment of each of the segmented gears (e.g., segmented gears 208A, 214A, 218A, and 222A of gearbox 200). Each shifting slider 351 and respective gear segment have a defined relationship such that linear translation of shifting slider 351 causes a pivot of the gear segment, described in more depth below with respect to FIGS. 31, 32. The shifting slider and the hinge mechanism may be collectively referred to as a segment actuator or an actuator of the gear segment.

This enables the transition of the segmented gear between the coplanar and pivoted configurations via the translation of the shifting sliders. Accordingly, the shifting sliders may be selectively transitioned between a first position, corresponding to the coplanar configuration of the segmented gear, and a second position, corresponding to the pivoted configuration of the segmented gear. For reference, the shifting sliders are shown in the first position in FIG. 29 and the second position in FIG. 30.

A description of shifting system 310 causing the selective transitioning of the segmented gear between its two configurations (coplanar and pivoted) is now provided.

Consider shifting sliders 351 in their second position and cam 350 in its first state. In this configuration, cam 350 is oriented such that first face 356 is in the path of first protrusion 352. A rotation of the gear cluster (e.g., by a user) in the direction indicated by arrow B thereby causes first protrusion 352 to strike first face 356 causing shifting slider 351 to translate in a generally outward direction along the path indicated by arrow C. In some examples, protrusion 352 follows the contour of face 356, in the manner of a cam and follower mechanism, thereby guiding slider 351 outwards gently, so as to not cause any unnecessary force on the slider or the cam.

As the gear cluster continues to rotate, the first protrusion of each subsequent slider 351 strikes first face 356 until all four of the shifting sliders have been translated outwards into their first position, as reflected in FIG. 29. After all the sliders have translated outwards in this manner, the segmented gear has been fully shifted into its coplanar configuration. Additionally, since the sliders have been translated outwards, the cam is no longer in the path of any of the first protrusions. Accordingly, the gear cluster may rotate freely without any further shifting.

Now consider cam 350 has been pivoted by actuator 348 into its second state. In this configuration, cam 350 is oriented such that second face 358 is in the path of second protrusion 354. A rotation of the gear cluster in the direction indicated by arrow B thereby causes second protrusion 354 to strike second face 358 causing shifting slider 351 to translate in a generally inward direction along the path indicated by arrow C. In some examples, protrusion 354 follows the contour of face 358, in the manner of a cam and follower mechanism.

As the gear cluster continues to rotate, the second protrusion of each subsequent slider 351 strikes second face 358 until all four of the shifting sliders have been translated inwards into their second position, as reflected in FIG. 30. After all the sliders have translated inwards in this manner, the segmented gear has been fully shifted into its pivoted configuration. Additionally, since the sliders have been translated inwards, the cam is no longer in the path of any of the second protrusions. Accordingly, the gear cluster may rotate freely without any further shifting.

Figure 31:
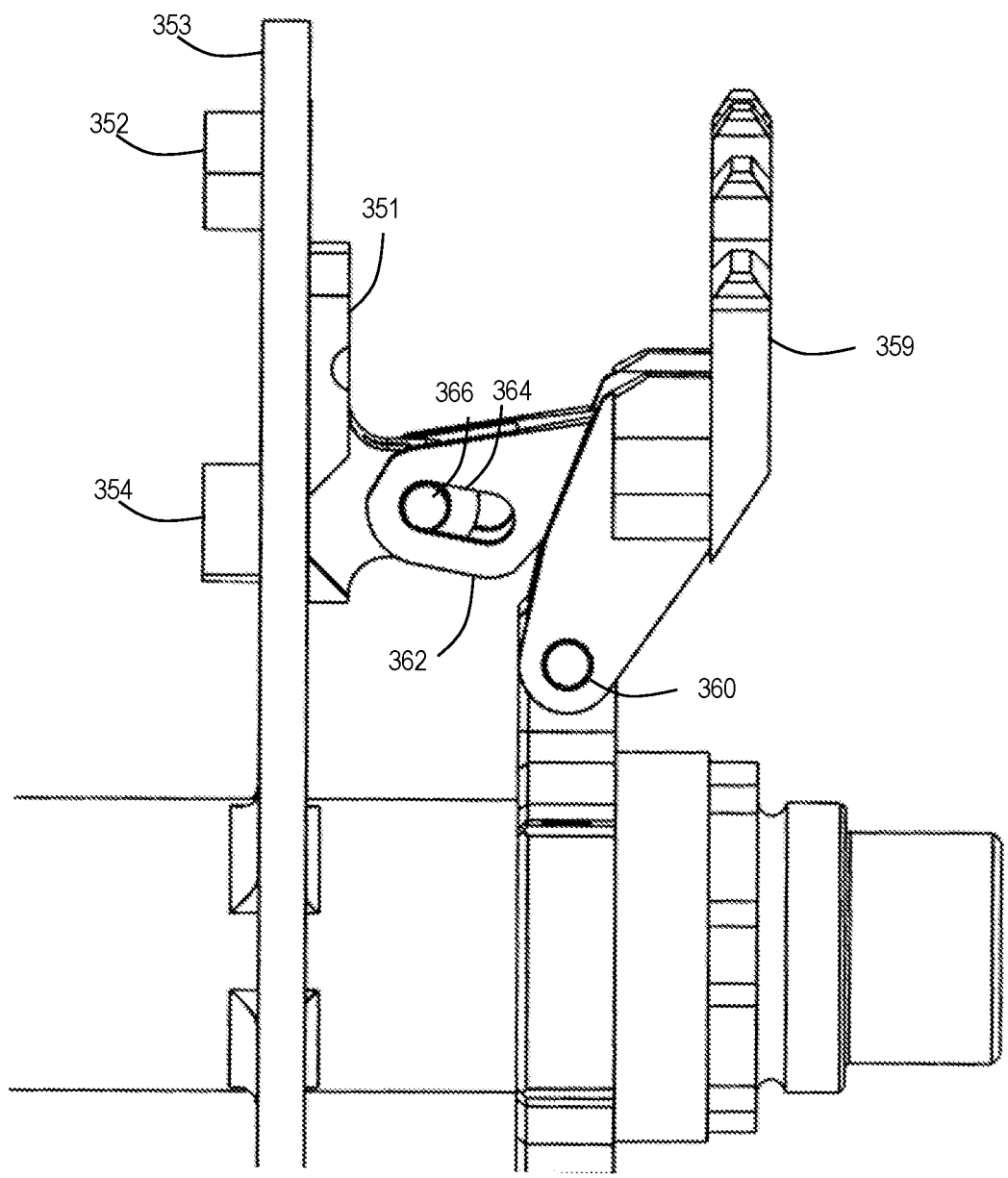
FIG. 31 is another view of the shifting system of FIG. 28 in the first position, corresponding to FIG. 29.
Figure 32:
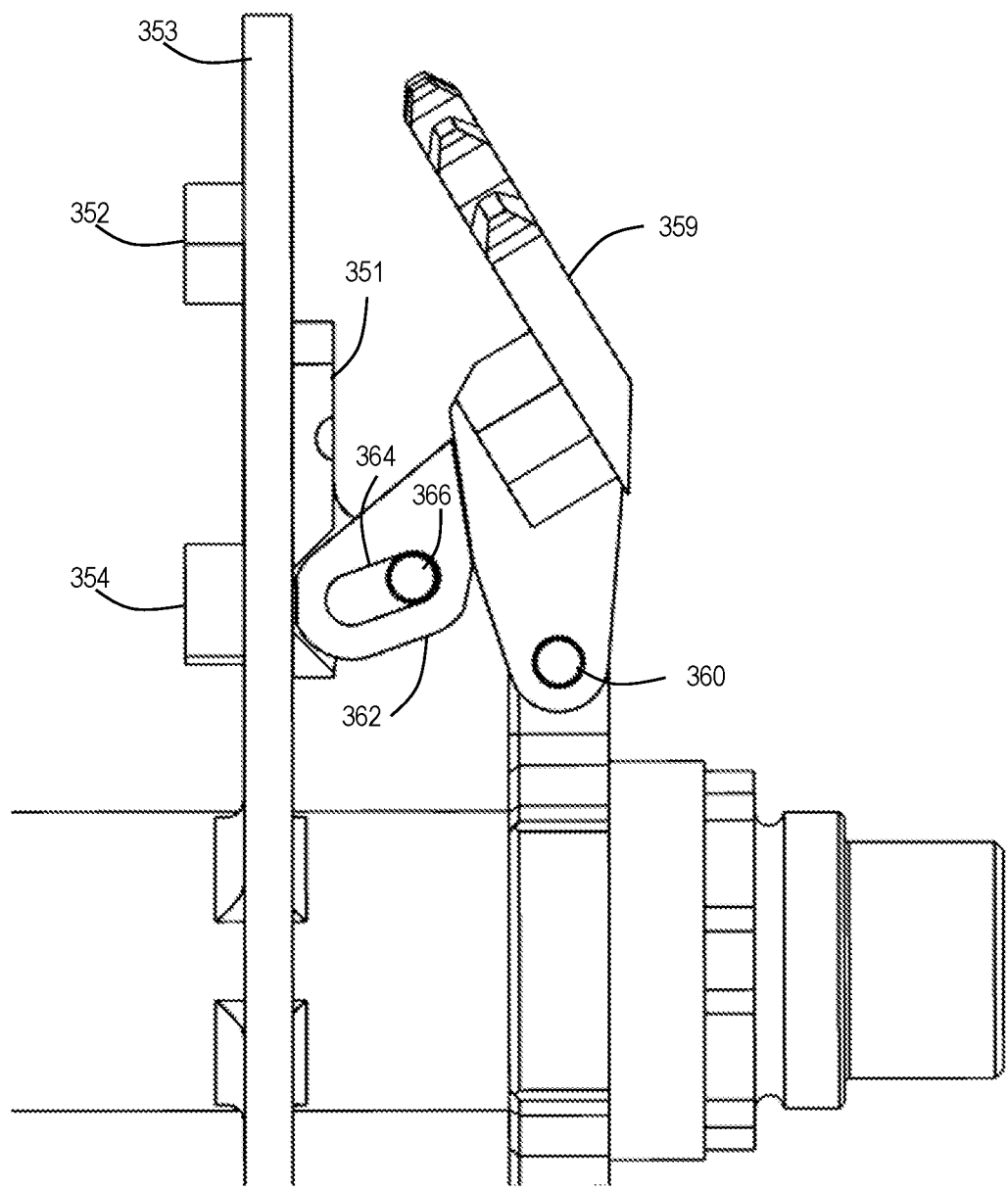
FIG. 32 is another view of the shifting system of FIG. 28 in the second position, corresponding to FIG. 30.

Turning to FIGS. 31 and 32, the relationship between the linear motion of slider 351 and the pivoting of the corresponding gear segment is now described further. For reference, shifting slider 351 is shown in the first position in FIG. 31 (corresponding to FIG. 29 and the coplanar position of the segmented gear) and shown in the second position in FIG. 32 (corresponding to FIG. 30 and the pivoted position of the segmented gear).

FIGS. 31 and 32 are side views depicting the operational engagement between shifting slider 351 and a single segment 359 of a segmented gear in the coplanar and pivoted positions, respectively. In the example of FIGS. 31 and 32, the depicted gear segment is analogous to the segmented gear of third gear cluster 218 (i.e., segmented gear 218A), although the underlying principle is the same for each of the segmented gears described herein.

Gear segment 359 is pivotally attached via a hinge knuckle to the layshaft at pivot 360, defining an axis of rotation. Pivot 360 corresponds to hinge pin 257 described above with respect to FIGS. 14 and 15. The gear segment is configured to rotate about this axis of rotation between the coplanar and pivoted positions. Furthermore, the gear segment includes an extension 362 having a slot or elongated aperture 364 formed therein. Shifting slider 351 is coupled to the gear segment via an actuating structure disposed on an opposite side of the guiding plate 353 from cam 350 and first and second protrusions 352 and 354, by way of a pin 366 seated slidingly within aperture 364.

As shown in FIG. 32, when shifting slider 351 is translated radially inward from the first position to the second position, pin 366 slides within aperture 364 and urges the gear segment from the coplanar position, rotating about the axis of rotation of pivot 360 into the pivoted position. Conversely, as shown in FIG. 31, when shifting slider 351 is translated radially outward from the second position to the first position, pin 366 again slides within aperture 364 and urges the gear segment from the pivoted position into the coplanar position.

As described above, this transitioning of the gear segment is performed at a time when the segment is unloaded (i.e., free of the chain/belt), such that shifting may be performed under load without negative consequences. Multiple segmented sprockets of the gearbox may be simultaneously shifted in this manner, if desired.

A method describing steps for shifting a segmented gear (e.g., describing the operation of system 310) is laid out below. Aspects of the gearboxes and shifting systems described above may be utilized in the method steps described below. Although various method steps are described below, the steps need not necessarily all be performed, and in some cases may be performed simultaneously or in a different order than the order described.

A first step includes rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane. In some examples, the second gear is unsegmented. In some examples, the second gear is segmented and each segment of the second gear has a fixed relationship with each corresponding segment of the first gear, such that pivoting one segment of the first gear automatically pivots the corresponding segment of the second gear.

In some examples, the second gear is concentric with the first gear and/or nested within the first gear. In some examples, the teeth of the second gear are coplanar with teeth of the first gear.

A second step includes rotating a plurality of radially transitionable sliders in tandem with the first gear, each of the sliders having one or more protrusions and coupled to a corresponding one of the gear segments of the first gear. In some examples, each of the sliders is coupled to the corresponding one of the segments by a slotted hinge. In some examples, the slotted hinge is on an opposite side of the slider with respect to the one or more protrusions. In some examples, the sliders are disposed in a common guide plate disposed adjacent the first gear.

A third step includes pivoting a cam into a first position such that a first ramped face of the cam is in a path of the one or more protrusions of the sliders.

A fourth step includes sequentially moving each segment of the first gear out of the plane of the power transfer mechanism by urging the slider radially when the one or more protrusions strike the first ramped face of the cam, such that the power transfer mechanism wraps at least partially around the second gear. In some examples, sequentially moving each segment includes pivoting each segment (e.g., on a pivot axis) transversely (for example, orthogonally) with respect to the plane of the power transfer mechanism. Sequentially moving each segment may be performed at a position where each segment is unloaded, i.e., substantially free of the power transfer mechanism.

To shift the gear cluster again, a fifth step includes pivoting a cam into a second position such that a second ramped face of the cam is in a path of the one or more protrusions of the sliders.

A sixth step includes sequentially moving each segment of the first gear into the plane of the power transfer mechanism by urging the slider radially within the guide plate when the one or more protrusions strike the second ramped face of the cam, such that the power transfer mechanism wraps at least partially around the first gear.

D. Illustrative Shifting System with Two-Pin Bistable Actuator

This section describes a shifting system 410. See FIGS. 33-35. Shifting system 410 is configured to be utilized in gearbox 100 and/or gearbox 200 as a direct replacement for shifting system 110, shifting system 210, and/or shifting system 310. Shifting system 410 is analogous to shifting system 310, with differences described below. Additionally, or alternatively, shifting system 410 may be utilized with any drivetrain including a pivoting segmented gear and/or segmented gear cluster (i.e., independent of a gearbox). For example, shifting system 410 may be utilized in the drivetrain of a bicycle, electric bicycle, or motorcycle having one or more segmented chainrings and/or cassette cogs.

Shifting system 410 includes a stationary multi-pin (e.g., two-pin) bistable linear actuator 412 configured to interact with a respective segment actuator 414 rotating with each of the segments 416 of a given gear cluster. Two-pin bistable linear actuator 412 causes each of the segments of the gear to selectively transition into and out of the plane of the belt or chain, such that the belt or chain is switched to a different gear (e.g., having a different diameter) without displacing the belt or chain out of its plane.

Figure 33:
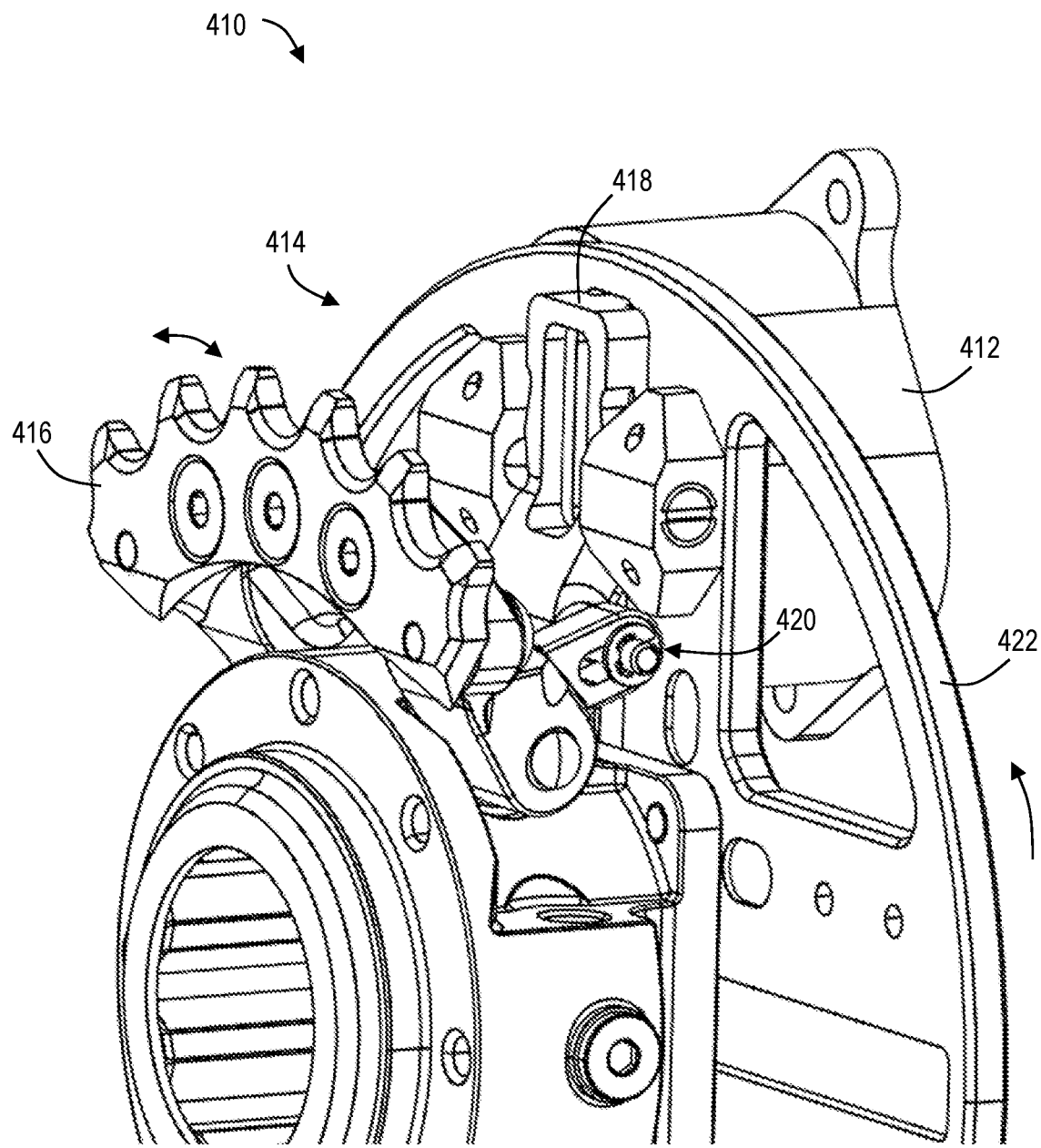
FIG. 33 is an illustrative shifting system having a bistable solenoid for use with gearboxes of the present disclosure.
Figure 34:
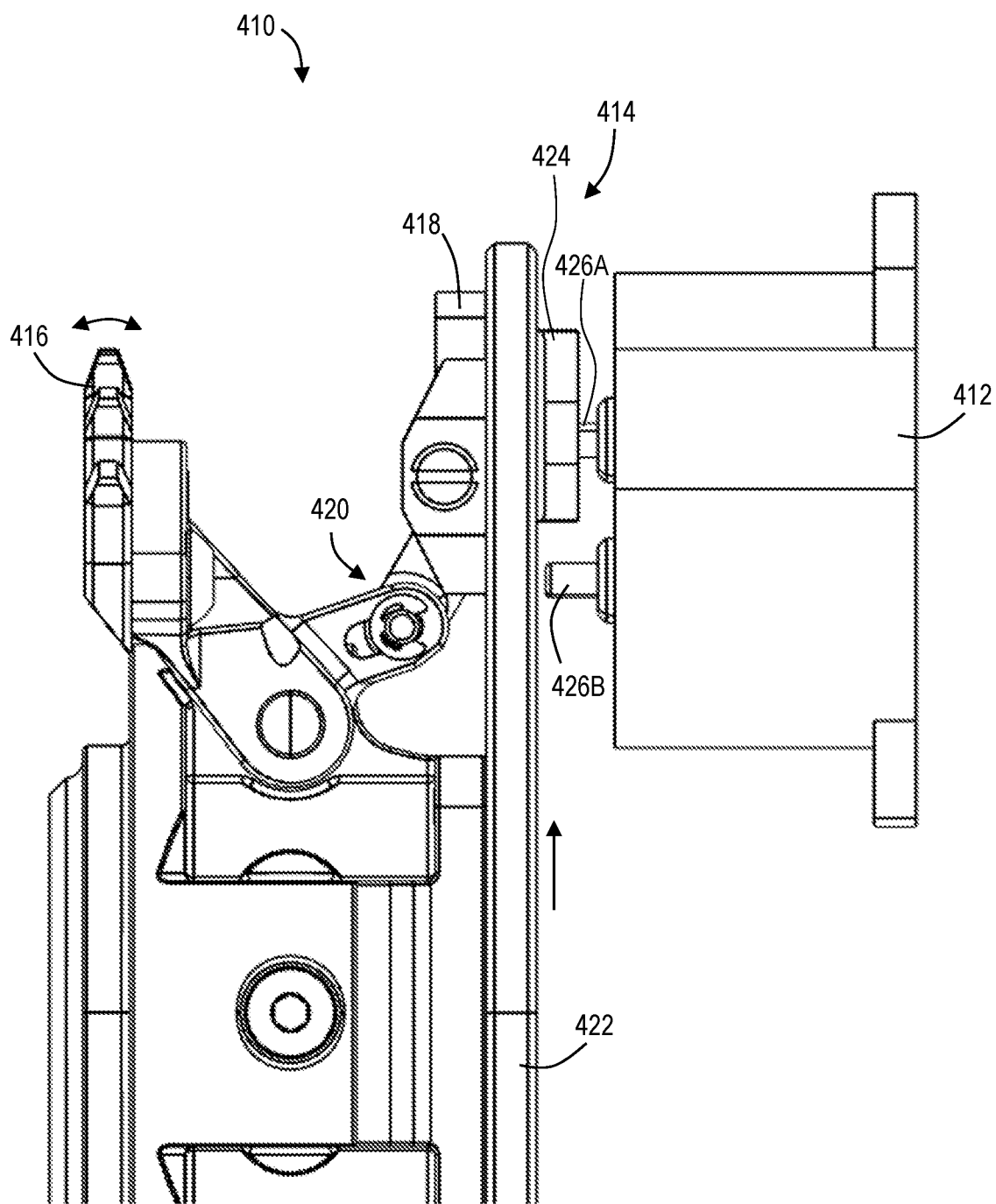
FIG. 34 depicts the shifting system of FIG. 33 in the first position.
Figure 35:
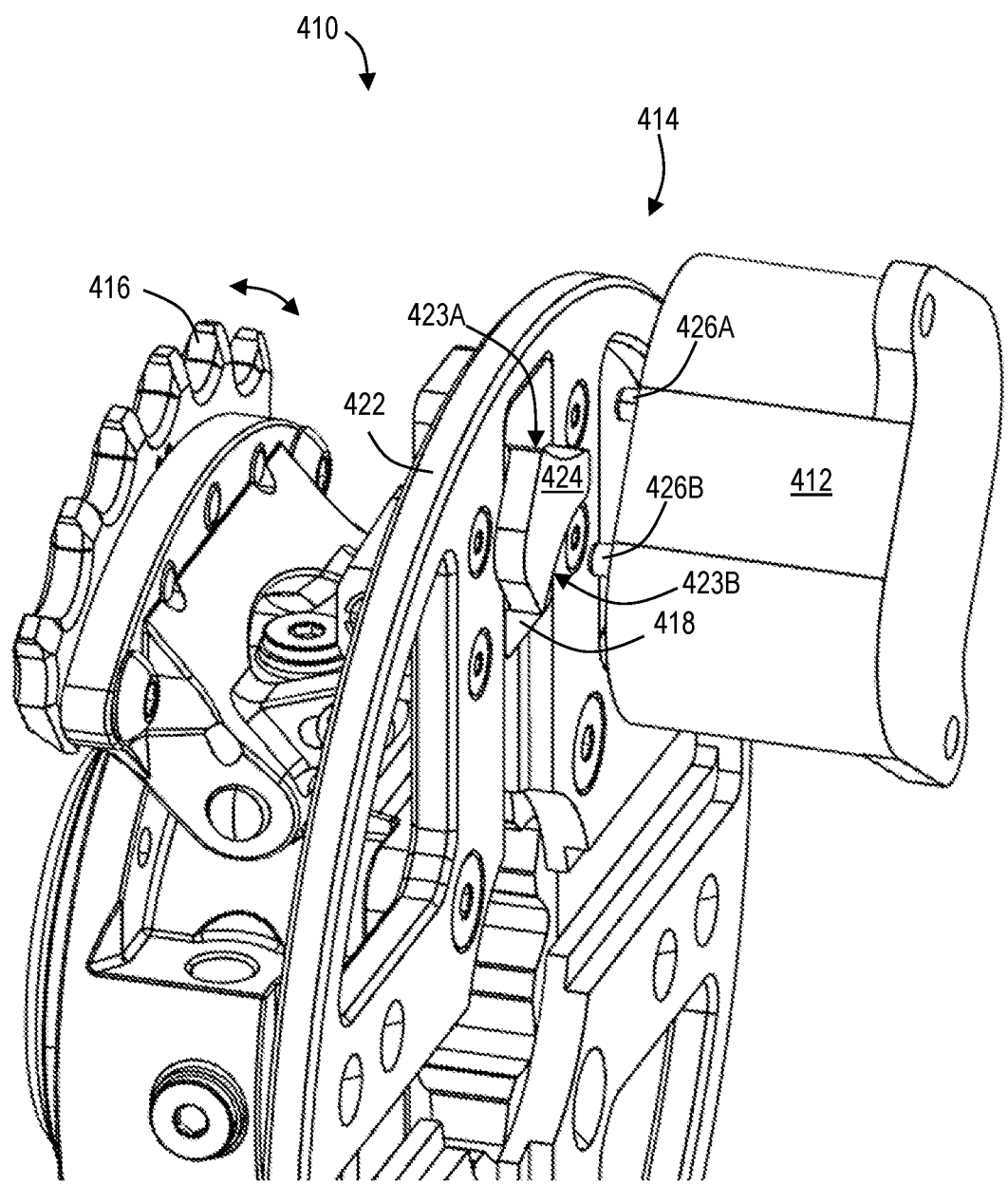
FIG. 35 is another view of the shifting system of FIG. 33 in the first position.

In the present example, each segment actuator 414 is a mechanical actuator comprising a slider 418 and a slip joint or slotted hinge mechanism 420. For efficiency of illustration, only one example of the segment actuators and segments is illustrated in FIGS. 33-35. Each slider 418 is configured to translate radially in a guide plate 422 that rotates with the gear cluster, the slider being coupled to the respective gear segment 418 by the slip joint or slotted hinge mechanism 420. In other words, the segment actuators transform the linear motion of the sliders into the pivoting motion of the gear segments. Radial translation of slider 418 is caused when a ramped face or edge 423A, 423B (AKA cam surfaces) of a wedge or cam 424 of the slider rotates into contact with one of two pins 426A and 426B of actuator 412, thereby urging the wedge (and therefore the slider) in a radial direction. Because the slider is connected to the segment by the slotted hinge, this translation causes the segment to pivot on its pivot axis (as in the similar example depicted in FIGS. 31 and 32).

Shifting system 410 may include one or more of the two-pin bistable linear actuators coupled to a mounting plate that is stationary relative to rotating guide plate 422. In some examples, the mounting plate is disposed at a central location in the gearbox, such that a respective one of the two-pin bistable linear actuators corresponds to each of the four gear clusters (e.g., see FIG. 4 and corresponding mounting plate 249 above). In the present example, the two-pin bistable linear actuators are under control of an electronic controller and/or a user.

Two-pin bistable linear actuator 412 comprises selectively extending pins configured to be inversely related to each other, such that extension of one of the two pins corresponds to a simultaneous retraction of the other of the two pins. Accordingly, the two states of the two-pin bistable linear actuator correspond to two operative positions, namely a first position in which a first one of the two pins is extended and a second position in which the other of the two pins is extended. As described below, the pins are configured to selectively mechanically interface with the cam wedges of the plurality of shifting sliders seated within the rotating guide plate.

Each of the slider wedges include a pair of ramped faces, which may be referred to herein as a first ramped face and a second ramped face. In some examples, the wedges have a symmetrical profile with lateral edges having generally linear or curvilinear contours. In some examples, the ramped faces have asymmetrical contours (i.e., one does not mirror the other).

As in other shifting systems described herein, two-pin bistable actuator 412 is disposed in a stationary or fixed position, such that each segment actuator 414 interfaces with (and is repositioned by) the pins 426A, 426B of the actuator. This is configured to occur at a rotational position that pivots the segment when the segment is unloaded, i.e., unencumbered by the belt or chain. In the example depicted in FIG. 34, both pins are shown in an extended position to show their locations relative to other components. However, in normal operation actuator 412 is configured such that only one of the two pins is extended at any given time, and this pin extension is controlled by the system controller. One pin or the other is extended to cause the desired shifting action. For example, in the system depicted in FIGS. 33-35, edges 423A and 423B are ramped in a curvilinear manner, such that when pin 426A is extended to contact outer edge 423A, slider 418 is urged radially inward, pivoting the toothed edge of segment 416 toward plate 422. Pin 426B is retracted (or remains retracted) during this operation, to avoid interference. In this example, pin 426A remains extended to contact the respective outer edge 423A of each consecutive actuator as it rotates around. Conversely, to pivot the toothed edge of segment 416 away from plate 422 and into the path of the chain or belt, pin 426B is extended and pin 426A is retracted (or remains retracted). Pin 426B is contacted by inner edge 423B of cam 424, urging slider 418 radially outward and pivoting the segment.

In the depicted example, cam surfaces or edges 423A and 423B are different from each other because the cam wedge translates and rotates at the same time. Therefore, during operation upper edge 423A effectively rotates into the actuator pin while lower edge 423B rotates away from the actuator pin. In this example, the curvilinear shapes are each parabolic, such that force on the actuator pin is generally constant throughout the sliding action. In some examples, these curves are shaped to facilitate minimization of the side load force on the respective pin at all points of the edge (cam surface).

An operational description of shifting system 410 causing the selective transitioning of the segmented gear between its two configurations (coplanar and pivoted) is now provided. With respect to FIG. 34, consider the shifting sliders in their first position (corresponding to the coplanar configuration) and the two-pin bistable solenoid in its first state in which the top pin (i.e., pin 426A) is extended and the bottom pin (i.e., pin 426B) is retracted. In this configuration, pin 426A is oriented to be in the path of the first face of the wedge.

Turning to FIG. 35, a rotation of the gear cluster (e.g., by a user) in the direction indicated by arrow F thereby causes the pin to strike the first face of the wedge, thereby causing the shifting slider to translate in a generally inward direction until the slider is fully translated inwards into its second, pivoted position thereby causing the gear segment to rotate into the pivoted position (see FIG. 32).

As the gear cluster continues to rotate, the first face of each wedge of each subsequent slider strikes the pin until all four of the shifting sliders have been translated inwards into their second position. After all the sliders have translated inwards in this manner, the segmented gear has been fully shifted into its shifted configuration. Additionally, since the sliders have been translated inwards, the pin is no longer in the path of any of the wedges. Accordingly, the gear cluster may rotate freely without any further shifting. To return the gear cluster back to the first, coplanar position, the two-pin bistable actuator is transitioned to its second position, in which the other pin (i.e., pin 426B) is extended thereby striking the second face of each of the wedges and urging the sliders outward.

Figure 36:
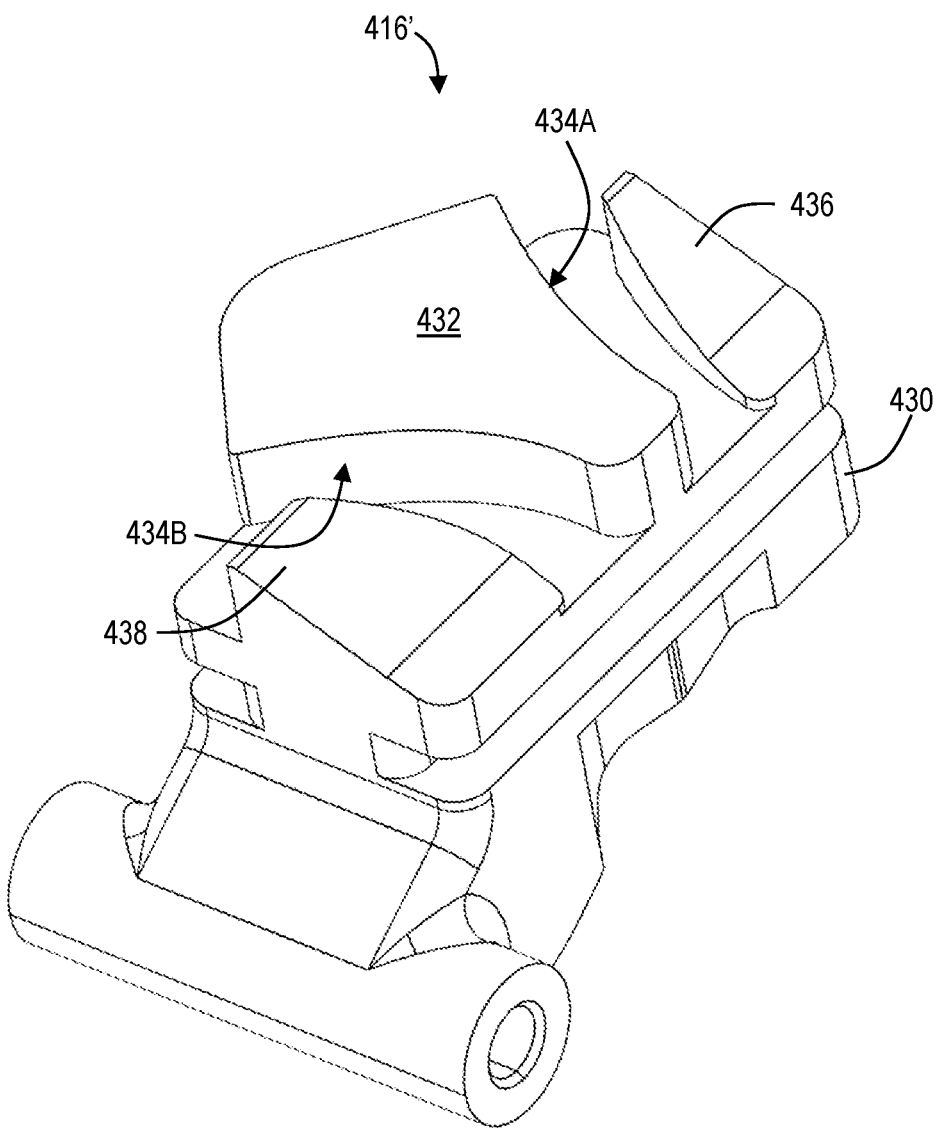
FIG. 36 is an illustrative slider for use with the shifting system of FIG. 33.

FIG. 36 depicts an alternative example of a slider, referred to here as slider 418'. Slider 418' includes a main body 430 having side slots configured to slide radially in a slot of guide plate 422. Wedge or cam 432 is disposed on a face of body 430, including an outer edge 434A and an inner edge 434B having corresponding functionality as described above with respect to wedge or cam 424. In this example, an outer pin ramp 436 and an inner pin ramp 438 are disposed on opposite sides of cam 432. Each of the pin ramps has a ramped face with an angled surface orthogonal to the edges of cam 432. The ramped faces are each configured to interact with a respective pin of two-pin bistable actuator 412, to urge the pin from an extended to a retracted position. Furthermore, outer pin ramp 436 is configured to encounter outer pin 426A when slider 418' has already been repositioned radially inward. Similarly, inner pin ramp 438 is configured to encounter inner pin 426B when slider 418' has already been repositioned radially outward.

Pin ramps 436 and 438 are configured and spaced from the inner and outer edges of cam 432, such that the pin ramps do not interfere with normal shifting operation. However, in examples where pin extension is not desired after shifting is complete, and/or if persistent pin extension is a failure condition that may cause unplanned collision, the pin ramps serve as a safety mechanism to reposition the pins without causing damage to the system.

Similar to the description in Sections B and C, each shifting slider is coupled to a hinge of a respective gear segment of each of the segmented gears. Each shifting slider and respective gear segment have a defined relationship such that linear translation of the shifting slider causes a pivot of the gear segment as described above with respect to FIGS. 29-32.

E. Illustrative Detent System

This section describes an illustrative detent system 800. Detent system 800 is configured to be utilized in any of the shifting systems described herein, e.g., shifting system 310 or shifting system 410. Detent system 800 is configured to retain the segment actuators of the shifting system(s) in place to prevent unwanted shifting or slipping, such as when the shifting system is jostled while a user is pedaling or navigating rough terrain.

Figure 37:
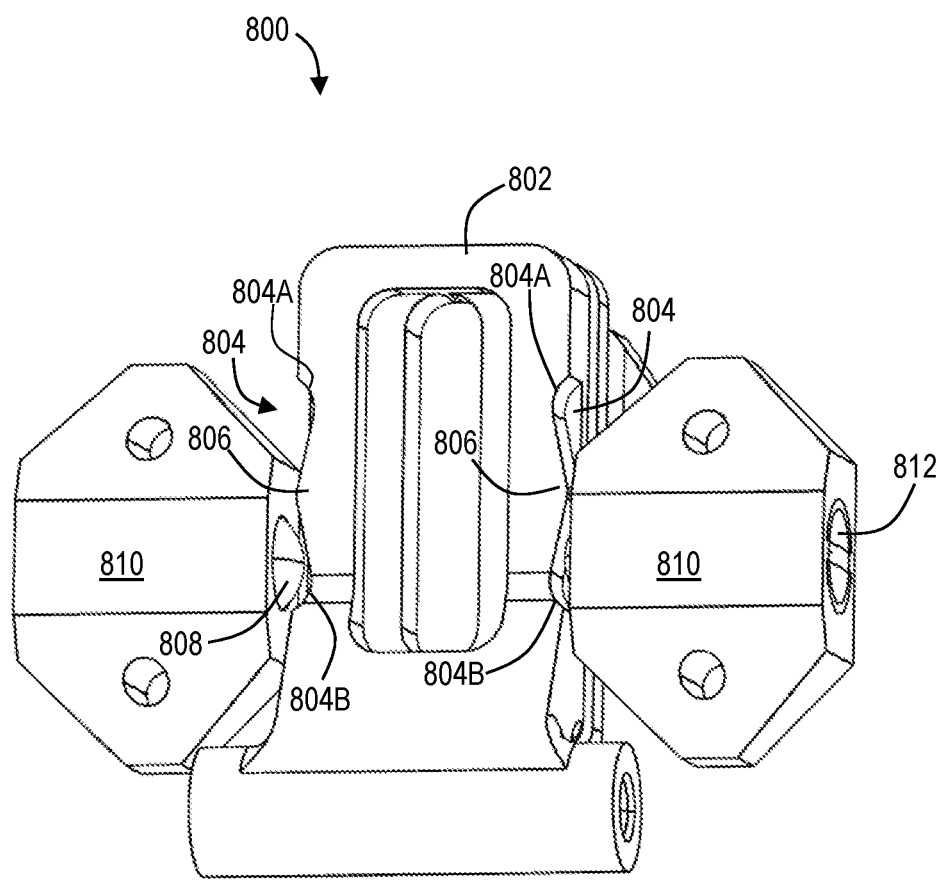
FIG. 37 is an illustrative detent system for use with gearboxes of the present disclosure.

As shown in FIG. 37, detent system 800 includes at least one slider 802 (AKA shifting slider) having a detent track 804. The hinge slider may be utilized as a direct replacement for slider 418 and/or any of the corresponding sliders in the abovementioned shifting systems. The hinge slider includes at least one detent track 804 having a generally W-shaped contour, such that the detent track includes two recesses 804A, 804B separated by an extension 806 (AKA a protrusion). In some examples, slider 802 includes two detent tracks 804 on opposing lateral edges (see FIG. 37).

Detent system 800 further includes at least one spring-loaded detent ball 808, which comprises a captured ball operatively coupled to a spring. In some examples, the detent ball and spring constitute a ball-nose spring plunger. Each detent ball 808 and spring are housed, at least partially, within a mounting block 810 coupled to the guide plate of the shifting system and oriented generally orthogonal to the slider, such that the detent ball is urged toward (and resiliently pressed against) the detent track. Each detent ball 808 is biased toward a corresponding detent track 804. In operation, the detent ball engages the surface of the detent track to selectively retain the slider in one of two positions (the two positions corresponding to the coplanar and pivoted positions of the sliders and gear segments).

Turning to FIG. 37, the slider is depicted in a first position such that the detent ball 808 is seated in a lower recess 804B of detent track 804. Due to the urging force of the spring and the shape of the recess, detent ball 808 is held in place in the recess and the slider is prevented from unwanted movement. As the shifting system translates the slider from the first position to the second position, the detent ball is pushed at least partially into the mounting block to enable the central portion of the detent track to pass the detent ball. After shifting into the second position, detent ball 808 is seated in upper recess 804A of the detent track.

Detent system 800 may include a mechanism for adjusting the tension of the spring. In some examples, the mechanism for adjusting the tension of the spring comprises a spring tension screw 812 (e.g., a grub screw, set screw, etc.) disposed within the mounting block opposite the detent ball. Accordingly, the tension (and therefore the restoring/urging force) of the spring may be fine-tuned by adjusting the position of the spring tension screw with respect to the spring. This configuration enables a user to selectively adjust a magnitude of the slider's resistance to movement.

F. Illustrative Combinations and Additional Examples

This section describes additional aspects and features of the gearbox systems described herein, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A gearbox for a vehicle, the gearbox comprising:
a drive spindle;
a first gear cluster coaxially fastened to the spindle such that the first gear cluster rotates with the spindle, wherein an inboard gear of the first gear cluster includes a plurality of pivotable inboard segments, each of which has a respective pin protruding transversely from an inboard face;
a second gear cluster having one or more gears coaxially fastened to a layshaft spaced from and parallel to the spindle, such that the layshaft rotates with the second gear cluster;
a continuous first belt or chain coupling the first gear cluster to the second gear cluster, such that the first gear cluster drives the second gear cluster and the first belt or chain defines a first plane, wherein the segments of the inboard gear of the first gear cluster are each pivotable into and out of the first plane;
a third gear cluster having one or more gears coaxially fastened to the layshaft and spaced from the second gear cluster, such that the third gear cluster rotates with the layshaft;
a fourth gear cluster having one or more gears coupled to a sleeve coaxially mounted over the spindle such that the sleeve rotates independently of the spindle;
a continuous second belt or chain coupling the third gear cluster to the second gear cluster, such that the third gear cluster drives the fourth gear cluster and the second belt or chain defines a second plane parallel to the first plane;
a chainring fastened to the sleeve, such that the chainring rotates with the fourth gear cluster; and
a shifting system including a first shifting wedge transitionable between:
  (a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and
  (b) a second configuration, in which a second ramped face of the wedge is in line with the pin of each segment of the inboard gear of the first gear cluster when the segment is in the first plane such that rotating the pins into the second ramped face is configured to urge the segment out of the first plane.

A1. The gearbox of A0, wherein the first gear cluster, second gear cluster, first belt or chain, third gear cluster, fourth gear cluster, and second belt or chain are enclosed in a housing.

A2. The gearbox of A0 or A1, wherein an outboard gear of the first gear cluster is nested within the inboard gear, such that the outboard gear is in line with the first plane.

A3. The gearbox of A2, wherein the outboard gear is a non-segmented gear.

A4. The gearbox of A0 or A1, wherein an outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

A5. The gearbox of any one of paragraphs A0 through A4, wherein the drive spindle is coupled to a crankset configured to rotate the spindle.

A6. The gearbox of any one of paragraphs A0 through A5, wherein the drive spindle is coupled to an electric motor configured to rotate the spindle.

A7. The gearbox of any one of paragraphs A0 through A6, wherein an inboard gear of the second gear cluster includes a plurality of pivotable segments, each of which has a respective pin protruding transversely from an inboard face.

A8. The gearbox of A7, the shifting system further comprising a second shifting wedge configured to pivot the segments of the inboard gear of the second gear cluster.

A9. The gearbox of any one of paragraphs A0 through A8, wherein a respective inboard gear of each of the third and fourth gear clusters includes a plurality of pivotable segments, each of which has a respective pin protruding transversely from an inboard face.

B0. A gearbox for a vehicle, the gearbox comprising:
a drive spindle;
a first gear cluster coaxially fastened to the spindle such that the first gear cluster rotates with the spindle, the first gear cluster including an outboard gear and an inboard gear, wherein the inboard gear is physically divided into a plurality of segments;
a second gear cluster having one or more gears coaxially fastened to a layshaft spaced from and parallel to the spindle, such that the layshaft rotates with the second gear cluster;
a continuous first belt or chain coupling the first gear cluster to the second gear cluster, such that the first gear cluster drives the second gear cluster and the first belt or chain defines a first plane, wherein the segments of the inboard gear of the first gear cluster are each movable into and out of the first plane;
a third gear cluster having one or more gears coaxially fastened to the layshaft and spaced from the second gear cluster, such that the third gear cluster rotates with the layshaft;
a fourth gear cluster having one or more gears coupled to a sleeve coaxially mounted over the spindle such that the sleeve rotates independently of the spindle; a continuous second belt or chain coupling the third gear cluster to the second gear cluster, such that the third gear cluster drives the fourth gear cluster;
a chainring fastened to the sleeve, such that the chainring rotates with the fourth gear cluster; and
a shifting system including an actuator configured to urge the segments of the inboard gear of the first gear cluster into and out of the first plane, such that a gear ratio of the gearbox is changeable without displacing the first belt or chain out of the first plane.

B1. The gearbox of B0, wherein the segments of the inboard gear of the first gear cluster are configured to translate into and out of the first plane along the spindle.

B2. The gearbox of B0, wherein the segments of the inboard gear of the first gear cluster are configured to pivot into and out of the first plane.

B3. The gearbox of B2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

B4. The gearbox of B2, wherein each of the segments of the inboard gear has a respective pin protruding transversely from an inboard face; and the actuator of the shifting system includes a shifting wedge transitionable between:
  (a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and
  (b) a second configuration, in which a second ramped face of the wedge is in line with the pin of each segment of the inboard gear of the first gear cluster when the segment is in the first plane such that rotating the pins into the second ramped face is configured to urge the segment out of the first plane.

B5. The gearbox of B2, wherein a respective inboard gear of each of the second, third, and/or fourth gear clusters includes a plurality of pivotable segments.

B6. The gearbox of B5, the actuator of the shifting system further comprising a second shifting wedge configured to pivot the segments of the inboard gear of the second gear cluster.

B7. The gearbox of any one of paragraphs B0 through B6, wherein the first gear cluster, second gear cluster, first belt or chain, third gear cluster, fourth gear cluster, and second belt or chain are enclosed in a housing.

B8. The gearbox of any one of paragraphs B0 through B2, wherein an outboard gear of the first gear cluster is nestable with the inboard gear.

B9. The gearbox of B8, wherein the outboard gear is a non-segmented gear.

C0. A gearbox for a vehicle, the gearbox comprising:
a drive spindle;
a layshaft spaced from and parallel to the spindle;
a first gear cluster coaxially fastened to one of the spindle or the layshaft and rotatable therewith, the first gear cluster including an outboard gear and an inboard gear, wherein the inboard gear is physically divided into a plurality of segments;
a second gear cluster coaxially fastened to the other of the spindle or the layshaft and rotatable therewith, the second gear cluster having one or more gears;
a continuous belt or chain coupling the first gear cluster to the second gear cluster, such that the belt or chain defines a plane, wherein the segments of the inboard gear of the first gear cluster are each movable into and out of the first plane;
a chainring coupled to the layshaft, such that the chainring rotates with the layshaft; and
a shifting system including an actuator configured to urge the segments of the inboard gear of the first gear cluster into and out of the plane of the belt or chain, such that a gear ratio of the gearbox is changeable without displacing the belt or chain out of the plane.

C1. The gearbox of C0, wherein the segments of the inboard gear of the first gear cluster are configured to translate axially into and out of the plane of the belt or chain.

C2. The gearbox of C0, wherein the segments of the inboard gear of the first gear cluster are configured to pivot into and out of the plane of the belt or chain.

C3. The gearbox of C2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the plane automatically pivots the outboard segment of the pair into the plane.

C4. The gearbox of C2, wherein each of the segments of the inboard gear has a respective pin protruding transversely from an inboard face; and wherein the actuator of the shifting system includes a shifting wedge transitionable between:
  (a) a first configuration, in which a first ramped face of the wedge is in line with the pin of each segment of the inboard gear of the first gear cluster when the segment is out of the plane, such that rotating the pin into the first ramped face is configured to urge the segment into the plane, and
  (b) a second configuration, in which a second ramped face of the wedge is in line with the pin of each segment of the inboard gear of the first gear cluster when the segment is in the plane such that rotating the pins into the second ramped face is configured to urge the segment out of the plane.

C5. The gearbox of C2, wherein a respective inboard gear of the second gear cluster includes a plurality of pivotable segments.

C6. The gearbox of C5, the actuator of the shifting system further comprising a second shifting wedge configured to pivot the segments of the inboard gear of the second gear cluster.

C7. The gearbox of any one of paragraphs C0 through C6, wherein the first gear cluster, second gear cluster, and belt or chain are enclosed in a housing.

C8. The gearbox of any one of paragraphs C0 through C2, wherein an outboard gear of the first gear cluster is nestable with the inboard gear.

C9. The gearbox of C8, wherein the outboard gear is a non-segmented gear.

D0. A vehicle drivetrain comprising:
a rotatable gear coupled to a continuous chain or belt defining a plane, the gear divided into a plurality of pivotable segments, such that an outer edge of each of the pivotable segments is transitionable into and out of the plane;
a plurality of segment actuators, each of the segment actuators rotatable with and coupled to a respective one of the pivotable segments;
a linear actuator coupled to a cam, wherein the linear actuator is configured to transition the cam between:
  (a) a first position, in which a first ramped face of the cam is disposed in a path of the segment actuator of each segment when the segment is out of the plane of the chain or belt, such that rotating the segment actuator into the first ramped face urges the segment into the plane, and
  (b) a second position, in which a second ramped face of the cam is disposed in the path of the segment actuator when the segment is in the plane of the chain or belt, such that rotating the segment actuator into the second ramped face urges the segment out of the plane.

D1. The drivetrain of D0, wherein the linear actuator does not rotate with respect to the rotatable gear.

D2. The drivetrain of paragraph D0 or D1, each of the segment actuators comprising a slider coupled to the respective segment by a hinge, each slider having two spaced-apart protrusions, wherein the cam is configured to selectively interact with the protrusions to translate the slider and pivot the segment.

D3. The drivetrain of D2, wherein the slider is disposed in a guiding plate configured to rotate with the rotatable gear.

D4. The drivetrain of D2 or D3, wherein each hinge includes a pin transversely movable within a slot.

D5. The drivetrain of any one of paragraphs DO through D4, wherein the cam is coupled to the linear actuator by a lever arm, such that linear motion of the linear actuator is translated into pivoting motion of the cam.

D6. The drivetrain of any one of paragraphs DO through D5, wherein the linear actuator is controlled by an electronic controller.

E0. A method for shifting a segmented gear, the method comprising:

rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane;

rotating a plurality of radially transitionable sliders in tandem with the first gear, each of the sliders having one or more protrusions and coupled to a corresponding one of the gear segments of the first gear;

pivoting a cam into a first position such that a first ramped face of the cam is in a path of the one or more protrusions of the sliders;

sequentially moving each segment of the first gear out of the plane of the power transfer mechanism by urging the slider radially when the one or more protrusions strike the first ramped face of the cam, such that the power transfer mechanism wraps at least partially around the second gear.

E1. The method of E0, wherein each of the sliders is coupled to the corresponding one of the segments by a slotted hinge.

E2. The method of E1, wherein the slotted hinge is on an opposite side of the slider with respect to the one or more protrusions.

E3. The method of any one of paragraphs E0 through E2, wherein sequentially moving each segment comprises pivoting each segment (e.g. on a pivot axis) transversely (for example, orthogonally) with respect to the plane of the power transfer mechanism.

E4. The method of any one of paragraphs E0 through E3, wherein the second gear is unsegmented.

E5. The method of any one of paragraphs E0 through E3, wherein the second gear is segmented and each segment of the second gear has a fixed relationship with each corresponding segment of the first gear, such that pivoting one segment of the first gear automatically pivots the corresponding segment of the second gear.

E6. The method of any one of paragraphs E0 through E5, wherein sequentially moving each segment is performed at a position where each segment is unloaded, i.e. substantially free of the power transfer mechanism.

E7. The method of any one of paragraphs E through E6, wherein the second gear is concentric with the first gear.

E8. The method of any one of paragraphs E0 through E7, wherein the second gear is nested within the first gear.

E9. The method of any one of paragraphs E0 through E8, wherein teeth of the second gear are coplanar with teeth of the first gear.

E10. The method of any one of paragraphs E through E9, further comprising:

pivoting a cam into a second position such that a second ramped face of the cam is in a path of the one or more protrusions of the sliders;

sequentially moving each segment of the first gear into the plane of the power transfer mechanism by urging the slider radially within the guide plate when the one or more protrusions strike the second ramped face of the cam, such that the power transfer mechanism wraps at least partially around the first gear.

E11. The method of any one of paragraphs E0 through E10, wherein the sliders are disposed in a common guide plate disposed adjacent the first gear.

F0. A linear actuator disposed on each slider may create a unique shift timing situation that may be simpler than other embodiments.

F1. For example, the linear actuator configuration of paragraph F0 and/or any of the disclosed shifting systems may utilize an angular position feedback sensor to measure/sense the rotational position of each gear (or gear cluster) at any point in time. The actuators on each slider can be programmed to move at the rotational position in which the respective gear segment that they are attached to disengages from the chain/belt. The shift window may be from the moment the gear segment disengages from the chain/belt until the moment where the chain/belt comes back onto the segment.

F2. The angular position feedback sensor of paragraph F1 may include optical sensor(s), hall effect sensor(s), or other suitable sensor(s)/system(s).

G0. In some examples, a commutator (or other system utilizing brushes and/or magnets) may be utilized to provide electrical power to rotating parts.

H0. A method for shifting a segmented gear, the method comprising:

rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane;

rotating a plurality of radially transitionable sliders in tandem with the first gear, wherein each of the sliders has a pair of ramped cam surfaces and is operatively coupled to a corresponding one of the gear segments of the first gear;

extending a first pin of a multi-pin actuator, wherein the multi-pin actuator is stationary with respect to the rotating sliders, such that the first pin is in a path of a first one of the ramped cam surfaces; and sequentially moving each segment of the first gear out of the plane of the power transfer mechanism by urging the slider in a radial direction when the first pin strikes the first ramped cam surface, such that the power transfer mechanism wraps at least partially around the second gear.

H1. The method of H0, wherein each of the sliders is coupled to the corresponding one of the segments by a slotted hinge.

H2. The method of H1, wherein the slotted hinge is on an opposite side of the slider with respect to the cam surfaces.

H3. The method of any one of paragraphs H0 through H2, wherein sequentially moving each segment comprises pivoting each segment (e.g. on a pivot axis) out of the plane of the power transfer mechanism.

H4. The method of any one of paragraphs H0 through H3, wherein the second gear is unsegmented.

H5. The method of any one of paragraphs H0 through H3, wherein the second gear is segmented and each segment of the second gear has a fixed relationship with each corresponding segment of the first gear, such that pivoting one segment of the first gear automatically pivots the corresponding segment of the second gear.

H6. The method of any one of paragraphs H0 through H5, wherein sequentially moving each segment is performed at a position where each segment is unloaded, i.e., substantially free of the power transfer mechanism.

H7. The method of any one of paragraphs H0 through H6, wherein the second gear is concentric with the first gear.

H8. The method of any one of paragraphs H0 through H7, wherein the second gear is nested within the first gear.

H9. The method of any one of paragraphs H0 through H8, wherein teeth of the second gear are coplanar with teeth of the first gear.

H10. The method of any one of paragraphs H0 through H9, further comprising:
extending a second pin of the multi-pin actuator, such that the second pin is in a path of a second one of the ramped cam surfaces; and
sequentially moving each segment of the first gear into the plane of the power transfer mechanism by urging the slider in a radial direction when the first pin strikes the first ramped cam surface, such that the power transfer mechanism wraps at least partially around the first gear.

H11. The method of any one of paragraphs H0 through H10, wherein the sliders are disposed in respective slots of a common guide plate disposed adjacent the first gear.

H12. The method of any one of paragraphs H0 through H11, wherein each of the ramped cam surfaces is curvilinear.

H13. The method of paragraph H12, wherein each of the ramped cam surfaces is parabolic.

H14. The method of paragraph H12 or H13, wherein the ramped cam surfaces are asymmetrical with respect to each other.

H15. The method of any one of paragraphs H0 through H14, further comprising: biasing the slider against radial repositioning using a spring-loaded ball and detent mechanism.

H16. The method of any one of paragraphs H0 through H15, wherein the pair of ramped cam surfaces are disposed on a same wedge portion of the slider.

K0. A method for shifting a segmented gear, the method comprising:
rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane;
rotating a plurality of radially transitionable sliders in tandem with the first gear, wherein each of the sliders is operatively coupled to a corresponding one of the gear segments of the first gear; and
sequentially moving each segment of the first gear out of the plane of the power transfer mechanism by urging the slider in a radial direction using a segment actuator, such that the power transfer mechanism wraps at least partially around the second gear.

K1. The method of paragraph K0, wherein the segment actuator comprises a first portion configured to interact with a second portion, the first portion being independent of and stationary with respect to the rotating sliders, and the second portion being disposed on each of the sliders.

K2. The method of K1, wherein the first portion is a multi-pin actuator and the second portion comprises one or more respective ramped cam surfaces of each of the sliders.

K3. The method of K1, wherein the first portion comprises one or more ramped cam surfaces and the second portion comprises one or more respective pins extending from each of the sliders.

K4. The method of any one of paragraphs K2 or K3, wherein each of the ramped cam surfaces is curvilinear.

K5. The method of paragraph K4, wherein each of the ramped cam surfaces is parabolic.

K6. The method of paragraph K4 or K5, wherein the one or more ramped cam surfaces are asymmetrical with respect to each other.

K7. The method of any one of paragraphs K0 through K6, wherein each of the sliders is coupled to the corresponding one of the segments by a slotted hinge.

K8. The method of any one of paragraphs K0 through K7, wherein sequentially moving each segment comprises pivoting each segment (e.g. on a pivot axis) out of the plane of the power transfer mechanism.

K9. The method of any one of paragraphs K0 through K8, wherein the second gear is unsegmented.

K10. The method of any one of paragraphs K0 through K9, wherein the second gear is segmented and each segment of the second gear has a fixed relationship with each corresponding segment of the first gear, such that pivoting one segment of the first gear automatically pivots the corresponding segment of the second gear.

K11. The method of any one of paragraphs K0 through K10, wherein sequentially moving each segment is performed at a position where each segment is unloaded, i.e., substantially free of the power transfer mechanism.

K12. The method of any one of paragraphs K0 through K11, wherein the second gear is concentric with the first gear.

K13. The method of any one of paragraphs K0 through K12, wherein the second gear is nested within the first gear.

K14. The method of any one of paragraphs K0 through K13, wherein teeth of the second gear are coplanar with teeth of the first gear.

K15. The method of any one of paragraphs K0 through K14, further comprising:
sequentially moving each segment of the first gear into the plane of the power transfer mechanism by urging the slider in a radial direction using the segment actuator, such that the power transfer mechanism wraps at least partially around the first gear.

K16. The method of any one of paragraphs K0 through K15, wherein the sliders are disposed in respective slots of a common guide plate disposed adjacent the first gear.

K17. The method of any one of paragraphs K0 through K16, further comprising:

biasing the slider against radial repositioning using a spring-loaded ball and detent mechanism.

Advantages, Features, and Benefits

The different embodiments and examples of the gearbox systems described herein provide several advantages over known solutions for shifting gear ratios of a bicycle or other vehicle. For example, illustrative embodiments and examples described herein allow a lower weight and greater flexibility in gearing choices relative to known systems.

Additionally, and among other benefits, illustrative embodiments and examples described herein allow for at least as many gear ratios as in known systems (e.g., 12 speeds) in a smaller package.

Additionally, and among other benefits, illustrative embodiments and examples described herein allow for a gear box that is simpler than known systems and/or easier to work on.

Additionally, and among other benefits, illustrative embodiments and examples described herein are able to function without the need for any sensors relating to rotational position of the gear and/or pivoting position of the gear segment(s). For example, one or more of the shifting systems described is configured to function properly independent of any information regarding rotational and/or pivoting positions of the segmented gear.

Additionally, and among other benefits, illustrative embodiments and examples described herein allow for selectively installing gear clusters having different numbers of gears in a gear box. Accordingly, gear clusters having more gears or fewer gears may be installed as desired. For example, gear clusters having fewer gears could be used when a lighter weight is desired, and gear clusters having more gears could be used when a greater number of gear ratios is desired.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for shifting a segmented gear, the method comprising:

rotating a gear cluster comprising a first gear and a coaxial second gear using a power transfer mechanism, wherein the power transfer mechanism defines a plane and is wrapped partially around the first gear, and wherein the first gear has a plurality of gear segments independently movable into and out of the plane;

rotating a plurality of radially transitionable sliders in tandem with the first gear, wherein each of the sliders is operatively coupled to a corresponding one of the gear segments of the first gear; and sequentially moving each segment of the first gear out of the plane of the power transfer mechanism by urging the slider in a radial direction using a segment actuator, such that the power transfer mechanism wraps at least partially around the second gear;

wherein the second gear is segmented and each segment of the second gear has a fixed relationship with each corresponding segment of the first gear, such that pivoting one segment of the first gear automatically pivots the corresponding segment of the second gear.

2. The method of claim 1, wherein the segment actuator comprises a first portion configured to interact with a second portion, the first portion being independent of and stationary with respect to the rotating sliders, and the second portion being disposed on each of the sliders.

3. The method of claim 2, wherein the first portion is a multi-pin actuator and the second portion comprises one or more respective ramped cam surfaces of each of the sliders.

4. The method of claim 2, wherein the first portion comprises one or more ramped cam surfaces and the second portion comprises one or more respective pins extending from each of the sliders.

5. The method of claim 1, wherein each of the sliders is coupled to the corresponding one of the segments by a slotted hinge.

6. The method of claim 1, wherein sequentially moving each segment comprises pivoting each segment out of the plane of the power transfer mechanism.

7. The method of claim 1, wherein sequentially moving each segment is performed at a position where each segment is unloaded.

8. The method of claim 1, further comprising:

sequentially moving each segment of the first gear into the plane of the power transfer mechanism by urging the slider in a radial direction using the segment actuator, such that the power transfer mechanism wraps at least partially around the first gear.

9. The method of claim 1, further comprising:

biasing each of the sliders against radial repositioning using a respective spring-loaded ball and detent mechanism.

10. A method for shifting a segmented gear, the method comprising:

rotating a gear cluster comprising a first gear and a coaxial second gear using a power transfer mechanism, wherein the power transfer mechanism defines a plane and is wrapped partially around the first gear, and wherein the first gear has a plurality of gear segments independently movable into and out of the plane;

rotating a plurality of radially transitionable sliders in tandem with the first gear, wherein each of the sliders has a pair of ramped cam surfaces and is operatively coupled to a corresponding one of the gear segments of the first gear;

extending a first pin of a multi-pin actuator, wherein the multi-pin actuator is stationary with respect to the rotating sliders, such that the first pin is in a path of a first one of the ramped cam surfaces; and sequentially moving each segment of the first gear out of the plane of the power transfer mechanism by urging the slider in a radial direction when the first pin strikes the first ramped cam surface, such that the power transfer mechanism wraps at least partially around the second gear.

11. The method of claim 10, wherein each of the sliders is coupled to the corresponding one of the segments by a slotted hinge.

12. The method of claim 11, wherein the slotted hinge is on an opposite side of the slider with respect to the cam surfaces.

13. The method of claim 10, wherein sequentially moving each segment comprises pivoting each segment out of the plane of the power transfer mechanism.

14. The method of claim 10, wherein sequentially moving each segment is performed at a position where each segment is unloaded.

15. The method of claim 10, further comprising:

extending a second pin of the multi-pin actuator, such that the second pin is in a path of a second one of the ramped cam surfaces; and sequentially moving each segment of the first gear into the plane of the power transfer mechanism by urging the slider in a radial direction when the first pin strikes the first ramped cam surface, such that the power transfer mechanism wraps at least partially around the first gear.

16. The method of claim 10, wherein the sliders are disposed in respective slots of a common guide plate disposed adjacent the first gear.

17. The method of claim 10, wherein each of the ramped cam surfaces is curvilinear.

18. The method of claim 17, wherein the ramped cam surfaces are asymmetrical with respect to each other.

19. The method of claim 10, further comprising:

biasing each of the sliders against radial repositioning using a spring-loaded ball and detent mechanism.

\* \* \* \* \*